United States Patent [19]

Tsutsumi et al.

[11] Patent Number: 5,243,525
[45] Date of Patent: Sep. 7, 1993

[54] SUSPENSION CONTROL SYSTEM

[75] Inventors: Yasuhiro Tsutsumi, Susono; Yuji Yokoya, Toyota; Yoshimichi Hara, Kuwana; Eiju Matsunaga, Anjou; Hiroyuki Kawata, Chiryu; Akira Fukami, Okazaki; Yutaka Suzuki, Nishio, all of Japan

[73] Assignees: Nippondenso Co., Ltd., Kariya; Toyota Jidosha Kabushiki Kaisha, Toyota, both of Japan

[21] Appl. No.: 580,387

[22] Filed: Sep. 11, 1990

[30] Foreign Application Priority Data

| Sep. 11, 1989 | [JP] | Japan | 1-235231 |
| Sep. 11, 1989 | [JP] | Japan | 1-235232 |
| Sep. 11, 1989 | [JP] | Japan | 1-235234 |
| Jan. 11, 1990 | [JP] | Japan | 2-4035 |

[51] Int. Cl.$^5$ ............................................. B60G 17/00
[52] U.S. Cl. ................................. 364/424.05; 280/707
[58] Field of Search .................. 364/624.01, 424.05; 280/707, 840

[56] References Cited

U.S. PATENT DOCUMENTS

| 4,664,409 | 5/1987 | Nakashima et al. | 280/707 |
| 4,666,180 | 5/1987 | Shirakuma | 280/707 |
| 4,673,194 | 6/1987 | Sugasawa | 280/707 |
| 4,717,172 | 1/1988 | Asami et al. | 280/707 |
| 4,717,173 | 1/1988 | Sugasawa et al. | 280/707 |
| 4,729,459 | 3/1988 | Inagaki et al. | 188/299 |
| 4,741,554 | 5/1988 | Okamoto | 280/703 |
| 4,749,210 | 6/1988 | Sugasawa | 280/707 |
| 4,797,823 | 1/1989 | Ikemoto et al. | 364/424.05 |
| 4,805,101 | 2/1989 | Dietrich et al. | 364/424.01 |
| 4,821,189 | 4/1989 | Hennecke et al. | 280/707 |
| 4,852,903 | 8/1989 | Tanaka et al. | 280/689 |
| 4,853,860 | 8/1989 | Achenbach | 364/424.05 |
| 4,861,068 | 8/1989 | McCabe | 280/714 |
| 4,872,701 | 10/1989 | Akatsu et al. | 280/703 |
| 4,882,693 | 11/1989 | Yopp | 364/424.05 |
| 4,907,154 | 3/1990 | Yasuda et al. | 364/424.05 |
| 4,909,536 | 3/1990 | Hale | 280/707 |
| 4,948,163 | 8/1990 | Kisushima et al. | 280/707 |
| 4,948,166 | 8/1990 | Kaneko | 280/707 |
| 4,970,645 | 11/1990 | Adachi et al. | 364/424.05 |
| 4,984,820 | 1/1991 | Uchiyama et al. | 280/707 |
| 4,989,148 | 1/1991 | Gürke et al. | 364/424.05 |
| 5,015,007 | 5/1991 | Uchiyama et al. | 280/707 |
| 5,034,890 | 7/1991 | Sugasawa et al. | 364/424.05 |
| 5,044,660 | 9/1991 | Yamamura et al. | 280/707 |

FOREIGN PATENT DOCUMENTS

| 0139145 | 5/1985 | European Pat. Off. |
| 0151421 | 8/1985 | European Pat. Off. |
| 0157181 | 10/1985 | European Pat. Off. |
| 265911 | 5/1988 | European Pat. Off. |
| 0285153 | 10/1988 | European Pat. Off. |
| 0311114 | 4/1989 | European Pat. Off. |
| 3830168 | 3/1989 | Fed. Rep. of Germany |
| 3923929 | 1/1990 | Fed. Rep. of Germany |
| 227515 | 12/1984 | Japan |
| 636238 | 2/1985 | Japan |
| 151108 | 8/1985 | Japan |
| 61-1518 | 1/1986 | Japan |
| 18513 | 1/1986 | Japan |
| 62-80111 | 4/1987 | Japan |
| 62-221907 | 9/1987 | Japan |
| 1-208212 | 2/1988 | Japan |
| 63-305014 | 12/1988 | Japan |
| 64-67407 | 3/1989 | Japan |
| 1-202176 | 8/1989 | Japan |
| 1-202177 | 8/1989 | Japan |
| 2068308 | 8/1981 | United Kingdom |
| 2186947 | 8/1987 | United Kingdom |

Primary Examiner—Thomas G. Black
Attorney, Agent, or Firm—Cushman, Darby & Cushman

[57] ABSTRACT

A suspension control system for controlling a suspension having a shock absorber provided for each wheel of a vehicle includes a damping force change rate detector which detects a damping force change rate indicating a rate of change of a damping force of the shock absorber, and a damping force controller which alters the setting of the damping force on the basis of a relationship between the damping force change rate and an adjustment reference value. The system also includes a road surface condition detector which detects a condition of a road surface on which the vehicle is running on the basis of a change of the damping force of the shock absorber. Further, the system includes a damping force adjustment correcting unit which corrects the adjustment reference value by learning the adjustment reference value on the basis of a parameter related to the damping force of the shock absorber which reflects the condition of the road surface.

28 Claims, 25 Drawing Sheets

SUSPENSION CONTROL SYSTEM

BACKGROUND OF THE INVENTION (1) Field of the Invention

The present invention generally relates to a suspension control system, and more particularly to a suspension control system for controlling a damping force of a variable damping force type shock absorber on the basis of a running condition of a vehicle.

(2) Description of the Related Art.

There is known a suspension control system in which the damping force of a shock absorber is controlled on the basis of the rate of change of the damping force. When the change rate of the damping force exceeds a predetermined value, that is, when the change rate changes abruptly due to a rough road surface or braking, the damping force with respect to a movement of the shock absorber is rapidly changed to a small level, so that the control responsibility of the shock absorber is improved.

There is also known a suspension control system in which an adjustment reference value provided for obtaining the damping force change rate used for changing the setting of the damping force is altered on the basis of a driving condition, such as a vehicle speed, so that ride comfort is improved (see Japanese Laid-Open Patent Application No. 64-67407).

The conventional suspension control system proposed in the above-mentioned Japanese Application presents an advantage in that the damping force is rapidly changed in accordance with the road surface condition so that good ride comfort is obtained. However, there is room for improvement in ride comfort in a case where the vehicle is continuously running on a flat road surface or a rough road surface for a predetermined time or longer. When the vehicle is continuously running on a flat road surface, the shock absorber is controlled so that the damping force thereof is maintained at a large level and thus the suspension is maintained in a hard state. In this state, the driver or passenger will feel the existence of a small roughness in the road surface. On the other hand, if the vehicle is continuously running on a rough road surface, the shock absorber is controlled so that the damping force thereof is continuously maintained at a small level and thus the suspension is continuously maintained in a soft state. This state deteriorates the road holding ability of the vehicle and causes the driver to feel uneasy.

SUMMARY OF THE INVENTION

It is a general object of the present invention to provide an improved suspension control system in which the above-mentioned disadvantages are eliminated.

A more specific object of the present invention is to provide a suspension control system in which riding comfort as well as driving stability and controllability are improved.

The above-mentioned objects of the present invention are achieved by a suspension control system for controlling a suspension having a shock absorber provided for each wheel of a vehicle comprising:

damping force change rate detecting means, for detecting a damping force change rate indicating a rate of change of a damping force of the shock absorber;

damping force controlling means, coupled to the shock absorber and the damping force change rate detecting means, for altering the setting of the damping force on the basis of a relationship between the damping force change rate and an adjustment reference value;

road surface condition detecting means for detecting a condition of a road surface on which the vehicle is running on the basis of a change of the damping force of the shock absorber; and damping force adjustment correcting means, coupled to the damping force controlling means and the road surface condition detecting means, for correcting the adjustment reference value by learning the adjustment reference value on the basis of a parameter related to the damping force of the shock absorber which reflects the condition of the road surface.

The above-mentioned objects of the present invention are also achieved by a suspension control system for controlling a suspension having a shock absorber provided for each wheel of a vehicle comprising:

damping force change rate detecting means, for detecting a damping force change rate indicating a rate of change of the damping force of the shock absorber;

driving condition detecting means for detecting a driving condition of the vehicle which causes a tilt of a vehicle attitude of the vehicle;

damping force controlling means, coupled to the shock absorber and the damping force change rate detecting means, for altering the setting of a damping force on the basis of a relationship between the damping force change rate and an adjustment reference value;

correction means, coupled to the damping force controlling means, for comparing the tilt of the vehicle attitude with a first threshold value and for controlling the adjustment reference value so that it becomes difficult for the shock absorber to be altered to a soft state from a hard state when the tilt of the vehicle attitude is equal to or greater than the first threshold value; and shock absorber characteristic fixing means, coupled to the driving condition detecting means and the shock absorber, for comparing the tilt of the vehicle attitude with a second threshold value greater than the first threshold value and for fixing the shock absorber to a hard state when the tilt of the vehicle is equal to or greater than the second threshold value.

Other objects, features and advantages of the present invention will become more apparent from the following detailed description when read in conjunction with the accompanying drawings.

DETAILED OF THE PREFERRED EMBODIMENTS

Figure 1:
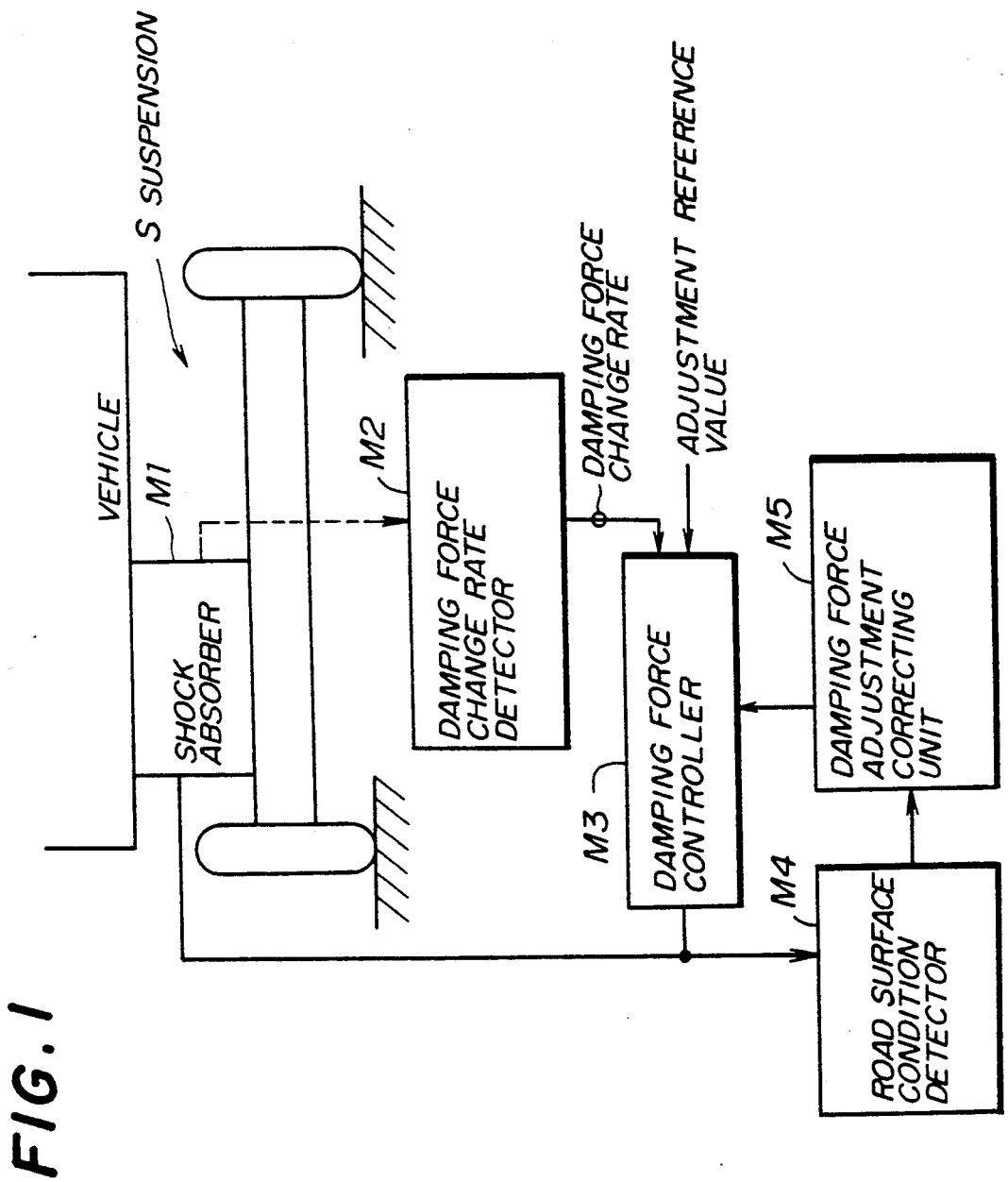
FIG. 1 is a block diagram illustrating the principle of a suspension control system according to a first preferred embodiment of the present invention.

Referring to FIG. 1, there is illustrated the principle of a suspension control system according to a first preferred embodiment of the present invention. A shock absorber M1 is provided in a suspension S of a vehicle and discretely provides different levels of the damping force. A damping force change rate detector M2 detects a rate of change of the damping force of the shock absorber M1. A damping force controller M3 controls the damping force of the shock absorber M1 on the basis of the difference between the damping force change rate and an adjustment reference value provided for adjusting the level of the damping force of the shock absorber M1. For example, when the damping force change rate exceeds the adjustment reference value, the shock absorber M1 is altered to a soft state. A road surface condition detector M4 detects a road surface condition on the basis of the situation where the setting of the damping force is actually altered by the damping force controller M3. Alternatively, it is possible to obtain the road surface condition by calculating the number of times that the damping force change rate exceeds a predetermined reference value (learning reference value) within a predetermined period. A damping force adjustment correcting unit M5 controls the damping force controller M3 when it is determined that the vehicle is continuously running on a flat road surface or a rough road surface. For example, the damping force adjustment correcting unit M5 controls the damping force controller M3 so that it becomes easy for the the shock absorber M1 to be altered to a soft state from a hard state when it is determined that the vehicle is running on a substantially flat road surface. On the other hand, when it is determined that the vehicle is continuously running on a rough road surface, the damping force adjustment correcting means M5 controls the damping force controller M3 so that it becomes easy for the shock absorber M1 to be altered from the hard state to the soft state. The above-mentioned control is realized by adjusting the adjustment reference value which is input to the damping force controller M3. As will be described, the adjustment of the damping force is achieved by, for example, a learning control which is based on a parameter related to a change of the damping force of the shock absorber M1 which reflects the road surface condition.

During operation, the road surface detector M4 detects the condition of the road surface condition on which the vehicle is running on the basis of the alteration status of the damping force by the damping force controller M3. For example, if the shock absorber M1 provides two or more discrete levels of damping force, the road surface detector M4 detects the current road surface condition on the basis of a damping force altering frequency or a damping force altering period at which the damping force of the shock absorber is actually altered to a different level. When the road surface detector M4 determines that the vehicle is continuously running on a substantially flat road surface or a rough road surface, the damping force adjustment correcting unit M5 controls the damping force controller M3 so that it becomes easy for the shock absorber M1 to be altered to the soft state. This is done by correcting the adjustment reference value so that it decreases. On the other hand, if it is determined that the vehicle is continuously running on a rough road surface, the damping force adjustment correcting unit M5 controls the damping force controller M3 so that it becomes easy for the shock absorber M1 to be altered to the hard state. This is done by correcting the adjustment reference value so that it increases. With the above-mentioned damping force control, it becomes possible to prevent the setting of the damping force from being biased to either the soft state or the hard state and thus provide a suspension characteristic having an excellent shock absorbing ability and road holding ability.

If the shock absorber M1 is formed of a shock absorber which continuously provides various levels of the damping force, the damping force adjustment correcting unit M5 controls the damping force controller M3 so that the damping force of the shock absorber M1 is simply increased or decreased on the basis of the detected road surface condition. It is also possible to carry out the above-mentioned damping force control separately for each wheel or separately for a group of two front wheels and a group of two rear wheels. Of course, it is possible to carry out the damping force control in common for all the wheels.

Figure 2:
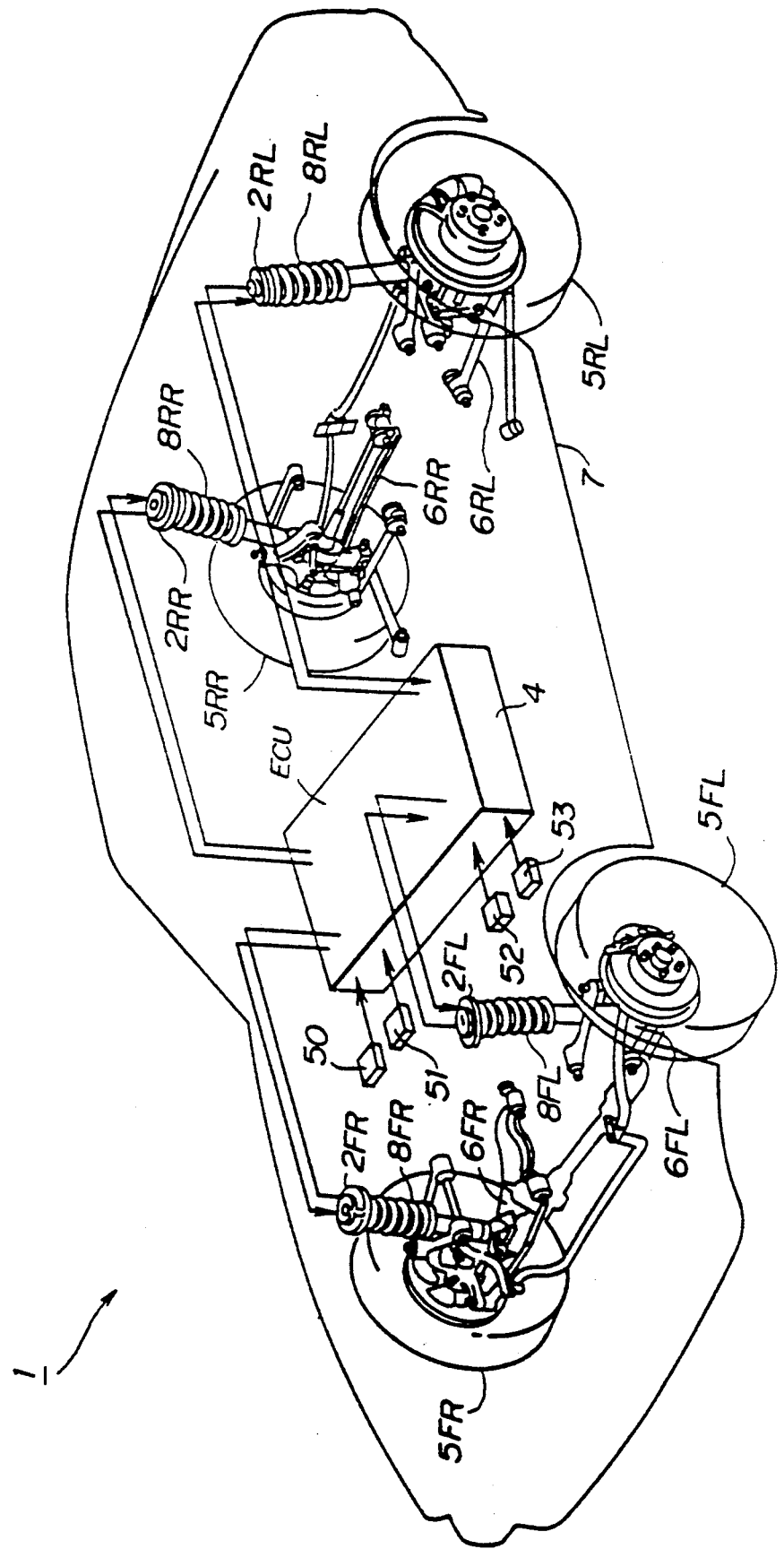
FIG. 2 is a perspective view illustrating a vehicle in which a suspension control system according to the present invention is installed.

A detailed description will now be given of the structure of the first embodiment of the present invention with reference to FIG. 2, which shows that the suspension control system according to the first preferred embodiment of the present invention is applied to variable damping force type shock absorbers 2FL, 2FR, 2RL, 2RR which are suspensions provided in a vehicle 1. The damping force of each of the shock absorbers 2FL, 2FR, 2RL and 2RR is switchable between a first level (soft state) and a second level (hard state). The shock absorber 2FL is provided between a vehicle body 7 and a suspension lower arm 6FL for a left front wheel 5FL. The shock absorber 2FR is provided between the vehicle body 7 and a suspension lower arm 6FR for a right front wheel 5FR. The shock absorber 2RL is provided between the vehicle body 7 and a suspension lower arm 6RL for a left rear wheel 5RL. The shock absorber 2RR is provided between the vehicle body 7 and a suspension lower arm 6RR for a right rear wheel 5RR. Each of the shock absorbers 2FL, 2FR, 2RL and 2RR includes a built-in piezoelectric load sensor and a piezoelectric actuator pair. The piezoelectric load sensors in the shock absorbers 2FL, 2FR, 2RL and 2RR detect force exerted on the shock absorbers 2FL, 2FR, 2RL and 2RR, respectively. The piezoelectric actuators in the shock absorbers 2FL, 2FR, 2RL and 2RR function to switch the damping forces thereof between the first level and the second level.

A description will now be given of the shock absorbers 2FL, 2FR, 2RL and 2RR. Since all the shock absorbers 2FL, 2FR, 2RL and 2RR have the same structure, only the shock absorber 5FL provided for the left front wheel is described for the sake of convenience. It will be noted that when there is no difference among the four shock absorbers, suffixes such as FL, FR, RL and RR are omitted.

Figure 3A:
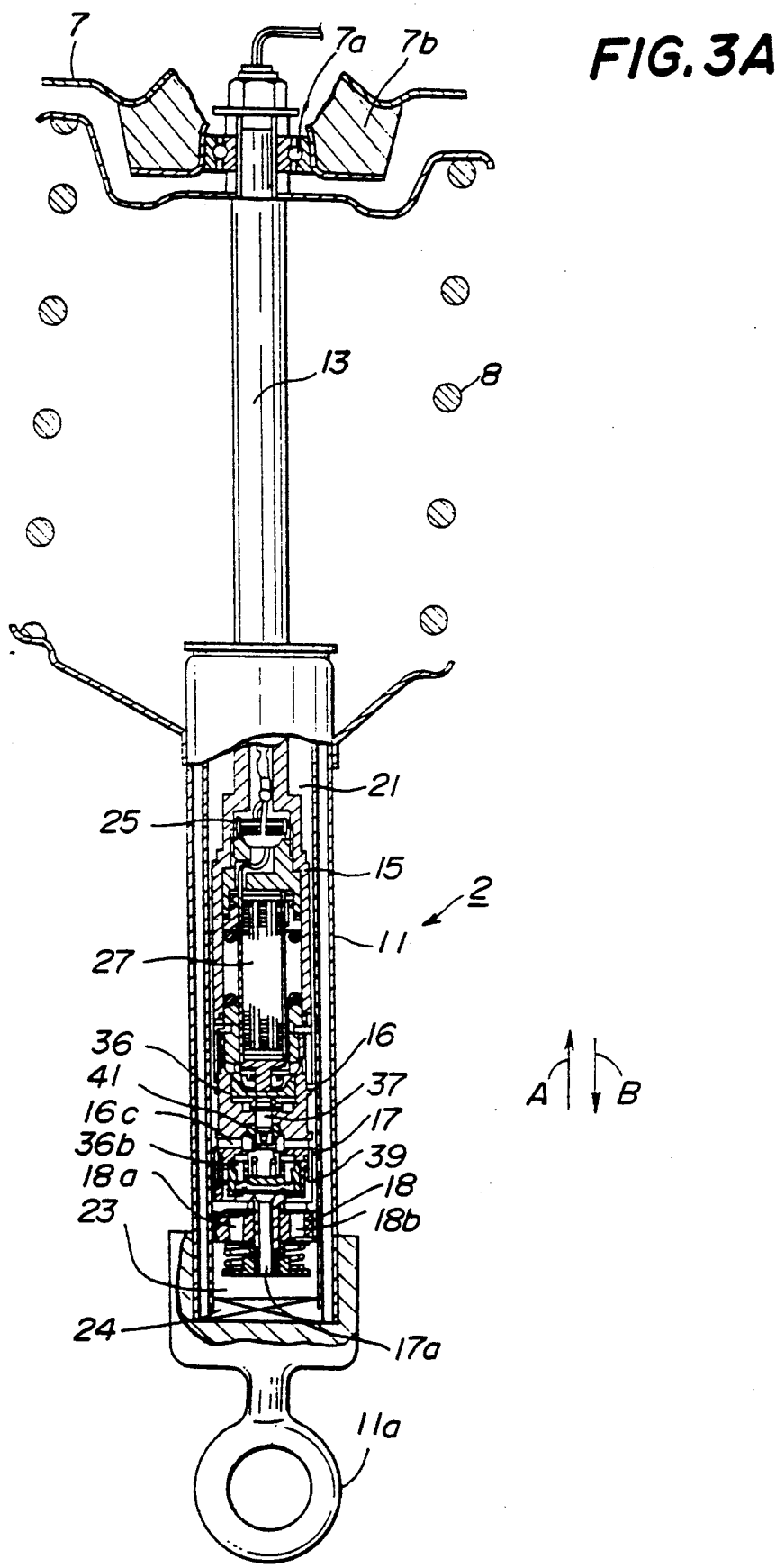
FIG. 3A is a partially sectional view of a shock absorber used in the vehicle shown in FIG. 2.

As shown in FIG. 3A, the shock absorber 2 is fixed to a suspension lower arm 6 through a wheel-shaft-side member 11a at a lower end of a cylinder 11. On the other hand, the shock absorber 2 is fixed, together with a coil spring 8, to the vehicle body 7 through a bearing 7a and a rubber element 7b at an upper end of a rod 13 which penetrates into the cylinder 11. Inside the cylinder 11, there are provided an internal cylinder 15, a connecting member 16 and a cylindrical member 17 which are coupled to the lower end of the rod 13, as well as a main piston 18 which is slidable along an inner surface of the internal cylinder 15. A piezoelectric load sensor 25 and a piezoelectric actuator 27 are accommodated in the internal cylinder 15 connected to the rod 13 of the shock absorber 2.

The main piston 18 is provided outside of the cylindrical member 17 and engages therewith. A seal member 19 is provided between a circumferential outer surface of the main piston 18 and the inner surface of the internal cylinder 15. An internal area of the cylinder 11 is separated into a first liquid room 21 and a second liquid room 23 by the main piston 18. A backup member 28 is provided on the leading end of the cylindrical member 17. The backup member 28 presses a spacer 29 and a leaf valve 30 against the cylindrical member 17 together with the main piston 18. In this state, the spacer 29 and the leaf valve 30 are fixed. A leaf valve 31 and a collar 32 are provided between the backup member 28 and the main piston 18. The leaf valve 31 and the collar 32 are pressed against the backup member 28 and fixed thereto in this state. A main valve 34 and a spring 35 are interposed between the leaf valve 31 and the backup member 28. The main valve 34 and the spring 35 urge the leaf valve 31 toward the main piston 18. A valve 24 selectively connecting a reserver room provided between the internal cylinder 15 and the cylinder 11 is provided on the bottom of the internal cylinder 15.

In a state where the main piston 18 is in a stationary state, the leaf valves 30 and 31 close a expansion-side path 18a and a contraction-side path 18b provided in the main piston 18 on a single side of both the expansion-side path 18a and the contraction-side path 18b. The paths 18a and 18b are opened on respective single sides thereof in accordance with a movement of the main piston 18 indicated by the arrow A or B. Thus, liquid filled in the first and second liquid rooms 21 and 23 passes through one of the paths 18a and 18b so that it moves between the first liquid room 21 and the second liquid room 23. In a state where the movement of liquid between the first liquid room 21 and the second liquid room 23 is limited to the movement between the paths 18a and 18b, a damping force generated with respect to the movement of the rod 13 is great so that the characteristic of the suspension is "HARD".

Figure 3B:
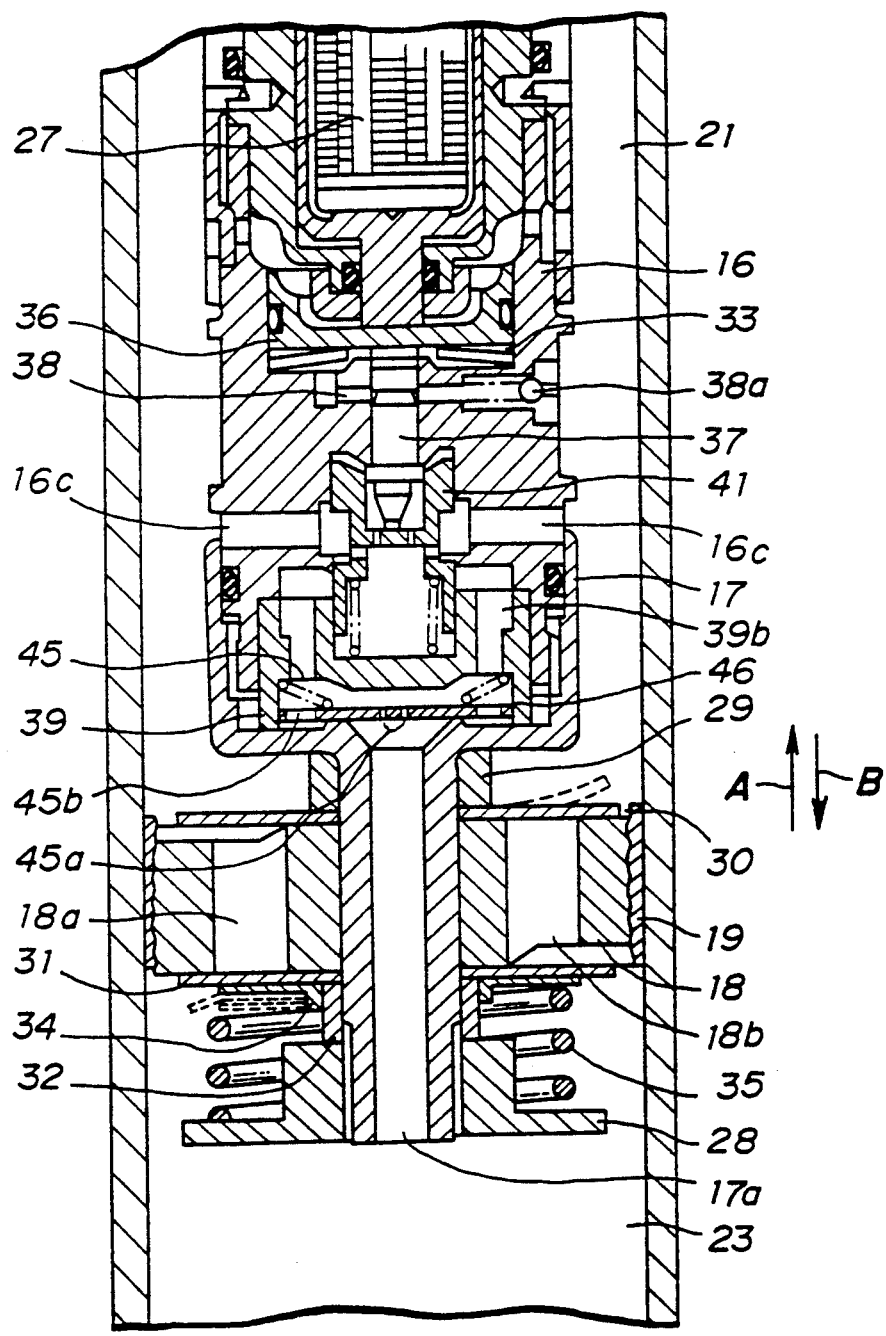
FIG. 3B is an enlarged sectional view of an essential part of the shock absorber shown in FIG. 3A.

As shown in FIGS. 3A and 3B, both the piezoelectric load sensor 25 and the piezoelectric actuator 27 provided inside the connecting member 16 are electrostriction element laminated members in which thin plates formed of piezoelectric ceramics are laminated through electrodes. In other words, one electrode is elevationally sandwiched between two adjacent thin plates. Each of the piezoelectric thin plates in the piezoelectric load sensor 25 is polarized due to a force generated in the shock absorber 2, that is, a damping force. An electrical output signal from each of the piezoelectric thin films in the piezoelectric load sensor 25 is supplied to an impedance circuit, which generates a voltage signal. Thus, it is possible to obtain a rate of change in the damping force from the voltage signal related to each of the piezoelectric thin films.

The piezoelectric actuator 27 has laminated electrostriction elements, each of which expands or contracts with a high response characteristic when a high voltage is applied thereto. The piezoelectric actuator 27 directly drives the piston 36. When the piston is moved in the direction indicated by the arrow B shown in FIG. 3B, a plunger 37 and a spool 41 having a substantially H-shaped cross section are moved in the same direction through the movement of oil in an oiltight room 33. When the spool 41 is moved from the position shown in FIG. 3B (original position) in the direction of the arrow B, a sub liquid path 16c connected to the first liquid room 21 and a sub liquid path 39b of a bush 39 connected to the second liquid room 23 become connected to each other. The sub liquid path 39b further becomes connected to a liquid path 17a in the cylindrical member 17 through an oil hole 45a formed in a plate valve 45. Thus, the movement of the spool 41 in the direction of the arrow B causes an increase in the amount of liquid which is transferred between the first liquid room 21 and the second liquid room 23. That is, when the piezoelectric actuator 27 expands with the high-voltage applied thereto, the shock absorber 2 is altered from the hard state to the soft state. When the piezoelectric actuator 27 is discharged so that no charge is stored therein, the piezoelectric actuator 27 is returned to "HARD".

The degree of movement of the leaf valve 31 provided on the lower surface of the main piston 18 is controlled by the spring 35. An oil hole 45b having a diameter greater than that of the oil hole 45a is formed in the plate valve 45 at a position farther from the center of the plate valve 45 than the oil hole 45a. When the plate valve 45 moves toward the bush 39 against the force by the spring 46, the oil is allowed to move through the oil hole 45b. Thus, the amount of oil obtained when the main piston 18 moves in the direction of the arrow B is greater than that obtained when the main piston 18 moves in the direction of the arrow A, irrespective of the position of the spool 41. That is, the damping force is altered due to the movement direction of the main piston 18 so that the characteristics of the shock absorber can be improved. An oil refilling path 38 is provided together with a check valve 38a between the oiltight room 33 and the first liquid room 21 so that the amount of oil in the oiltight room 33 is fixed. The shock absorber 2 shown in FIGS. 3A and 3B is disclosed in "AUTOMOBILE ENGINEERING MANUAL, FIFTH EDITION", JIDOSHA GIJUTSUKAI, 1983, pp. 4–27 or "TOYOTA CARINA FF NEW MODEL MANUAL", TOYOTA JIDOSHA KABUSHIKI KAISHA, 1985, pp. 4–87.

Figure 4:
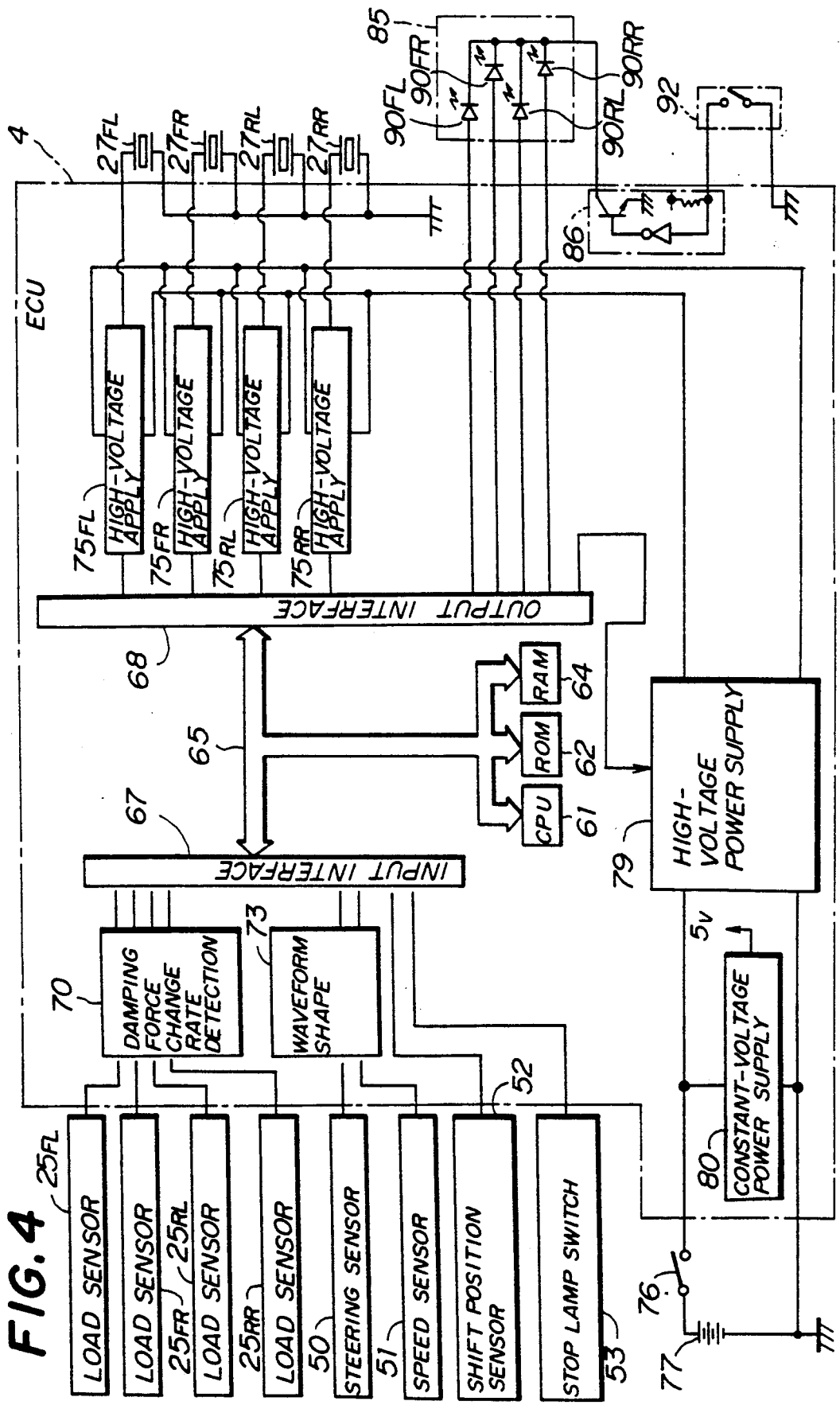
FIG. 4 is a block diagram illustrating a detailed structure of the suspension control system shown in FIG. 1.

A description will now be given of an electronic control unit (hereafter simply referred to as ECU) 4 for switching the damping force of each of the shock absorbers 2 between the first level (soft state) and the second level (hard state) with reference to FIG. 4. In order to detect the driving condition of the vehicle, the following sensors are provided in addition to the piezoelectric load sensors 25FL, 25FR, 25RL and 25RR. A steering sensor 50 detects the steering angle of a steering direction (not shown for the sake of simplicity) and generates a detection signal which indicates the current steering angle. A vehicle speed sensor 51 outputs a series of pulses having a number proportional to the current vehicle speed. A shift position sensor 52 detects the current a current shift position of a change gear (not shown) and generates a detection signal which indicates the current shift position. A stop lamp switch 53 generates a detection signal when a brake pedal is stepped on. The output signals from the above-mentioned sensors are input to the ECU 4. The ECU 4 generates output signals individually supplied to high-voltage application circuits 75FL, 75FR, 75RL and 75RR, which drive the piezoelectric actuators 27FL, 27FR, 27RL and 27RR, respectively.

The ECU 4 includes a central processing unit (hereafter simply referred to as a CPU) 61, a read only memory (ROM) 62 and a random access memory (RAM) 64, all of which are connected to a common bus 65. An input interface circuit 67 and an output interface circuit 68 are connected to the common bus 65.

The ECU 4 further includes a damping force change rate detection circuit 70, a waveform-shaping circuit 73, high-voltage application circuits 75FL, 75FR, 75RL and 75RR, an ignition switch 76, a battery 77, a high-voltage power supply circuit 79 and a constant-voltage power supply circuit 80.

The damping force change rate detection circuit 70 has four detection circuits (not shown) individually provided for the piezoelectric load sensors 25FL, 25FR, 25RL and 25RR. Each of the detection circuits receives the detection signal (a voltage signal V) supplied from the corresponding piezoelectric load sensor 25, and generates an output signal which corresponds to the voltage signal V and which indicates the damping force change rate. As has been described previously, the detection signal from each of the piezoelectric sensors 25FL, 25FR, 25RL and 25RR varies in accordance with a charge amount which is charged into or discharged from each of the piezoelectric thin films. The input interface circuit 67 includes an analog-to-digital converter (not shown), which converts the damping force detection signal in analog form into a digital signal. The waveform shaping circuit 73 shapes the waveforms of the detection signals from the steering sensor 50 and the vehicle speed sensor 51 into a waveform appropriate to signal processing executed by the CPU 61, such as a pulse waveform. The detection signals output by the shift position sensor 52 and the stop lamp switch 53 are input directly to the input interface circuit 67.

The high-voltage application circuits 75FL, 75FR, 75RL and 75RR are connected to the piezoelectric actuators 27FL, 27FR, 27RL and 27RR (FIG. 4), respectively. The high-voltage power supply circuit 79 is of a switching regulator type, and generates high voltages, +500 volts and −100 volts. Each of the high-voltage application circuits 75FL, 75FR, 75RL and 75RR applies a voltage of +500 volts or −100 volts to the corresponding piezoelectric actuator 27 in accordance with a control signal from the CPU 61. When a voltage of +500 volts is applied to the corresponding piezoelectric actuator, it expands. On the other hand, when a voltage of −100 volts is applied to the corresponding piezoelectric actuator, it contracts. Thereby, the oil amount is switched so that the shock absorber 2 is altered to the soft state or the hard state. That is, when the piezoelectric actuator 27 is expanded by the application of a voltage of +500 volts, an increased amount of liquid passes between the first liquid room 21 and the second liquid room 23 in the shock absorber 2 so that the damping force is decreased. On the other hand, when the piezoelectric actuator 27 is contracted by the application of a voltage of −100 volts, a decreased amount of liquid passes between the first liquid room 21 and the second liquid room 23 so that the damping force is increased. The constant voltage power supply circuit 80 converts the voltage of the battery 77 into an operating voltage (5 volts for example).

An indicator 85 is connected to the output interface circuit 68. The indicator 85 indicates the setting status of the damping force for each wheel. A driving circuit 86 which drives the indicator 85 is provided in the ECU 4.

Figure 5:
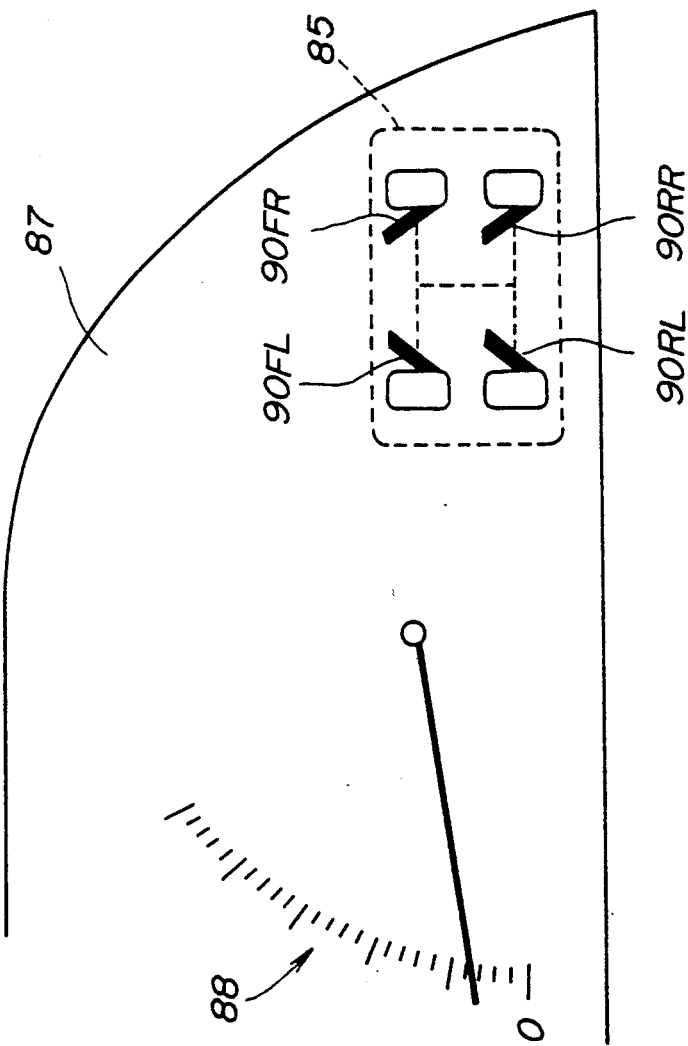
FIG. 5 is a diagram illustrating an indicator mounted on an inner panel in the vicinity of a speedometer.

As shown in FIG. 5, the indicator 85 which indicates the setting of the damping force of the shock absorber 2 provided for each wheel is provided in the vicinity of a speedometer 88 mounted on an inner panel 87. The indicator 85 has light-emitting diodes 90FL, 90FR, 90RL and 90RR provided for the piezoelectric actuators 27FL, 27FR, 27RL and 27RR, respectively. Each of the light-emitting diodes 90FL, 90FR, 90RL and 90RR emits light at two different intensity levels. When the shock absorber is set to the hard state, the output interface circuit 68 provides the corresponding light-emitting diode 90FL, 90FR, 90RL or 90RR with a small current, so that it emits light green light. When the shock absorber is switched to the soft state, the output interface circuit 68 provides the corresponding light-emitting diode 90FL, 90FR, 90RL or 90RR with a large current, so that it emits bright green light. An indicator switch 92 (FIG. 4) composed of a transistor, an inverter and a pull-up resistor is provided between the indicator 85 and ground. When the indicator switch 92 is set to OFF, the transistor thereof is turned OFF so that the indicator 85 is turned OFF.

Figure 6:
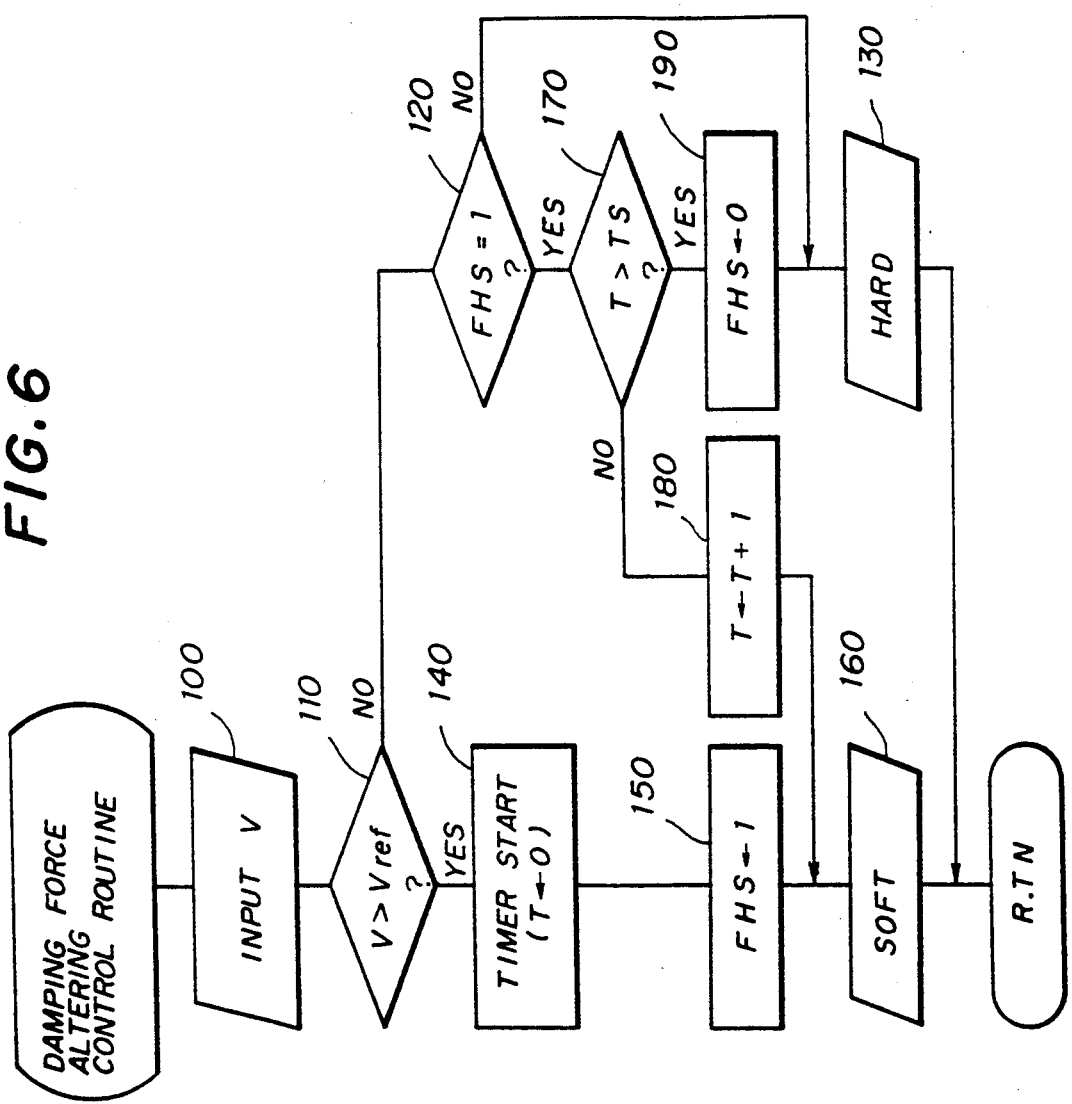
FIGS. 6, 7 and 8 are respectively flowcharts illustrating the operation of the suspension control system according to the first preferred embodiment.
Figure 7:
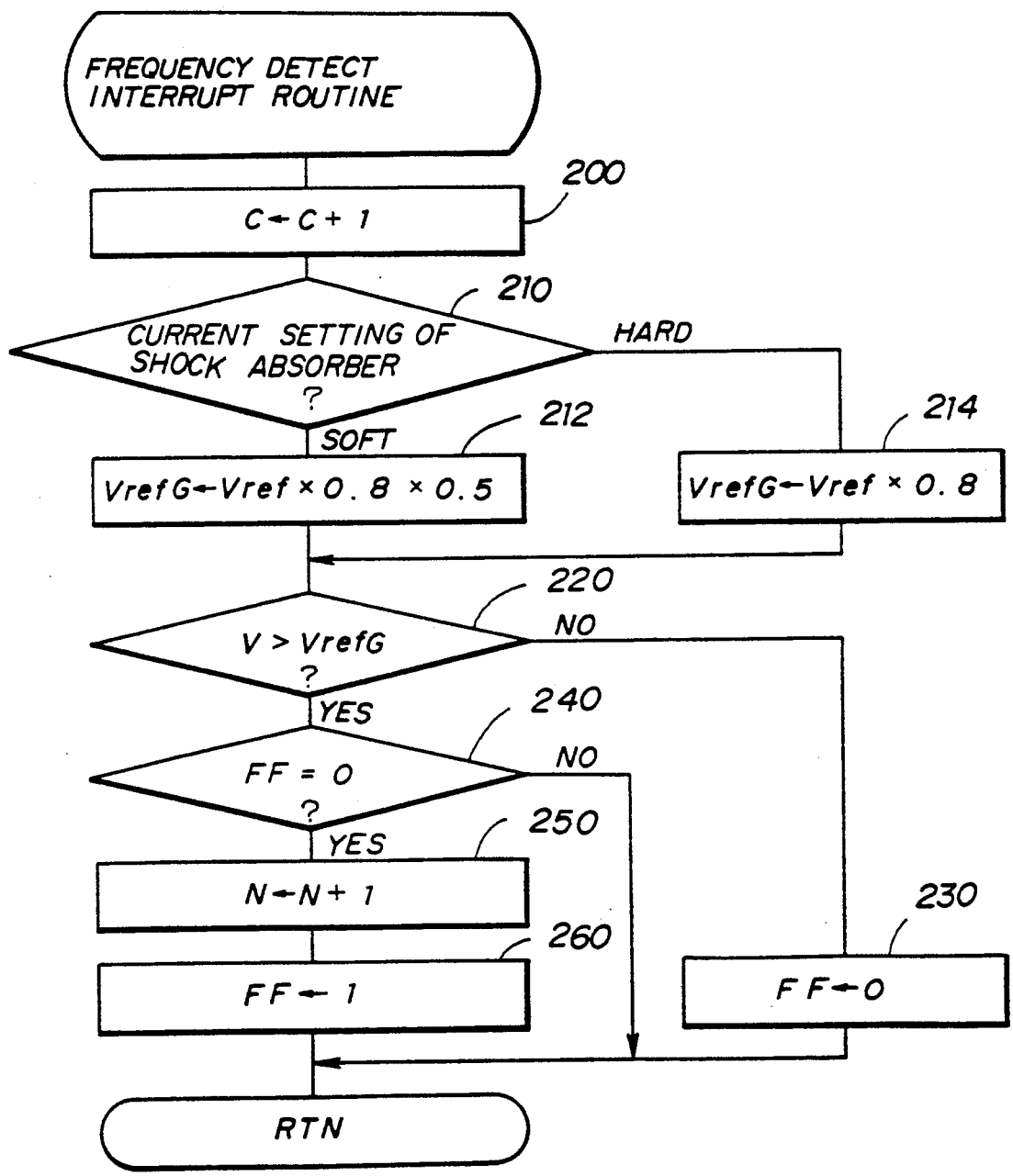
Figure 8:
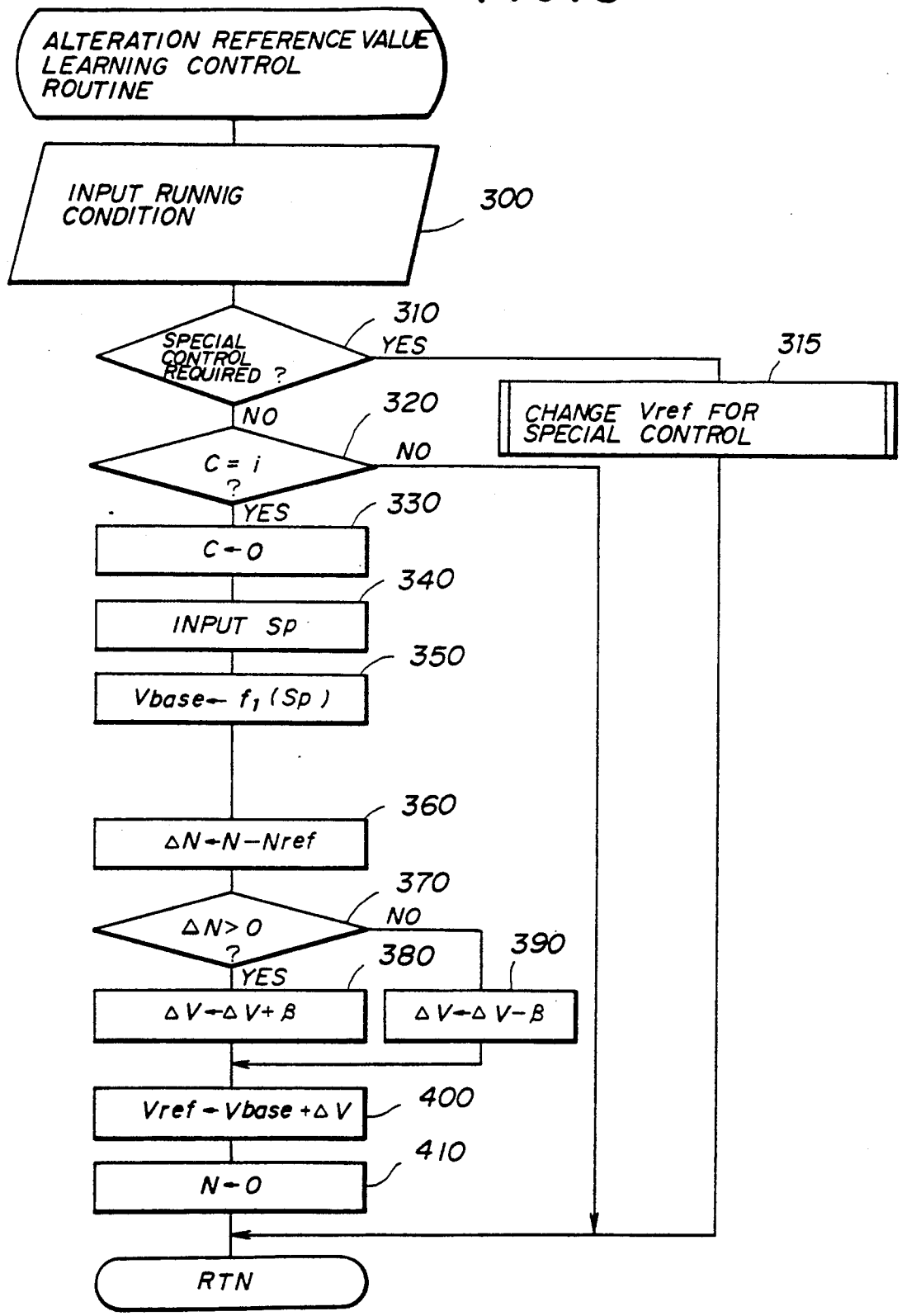

A description will now be given of a damping force control executed by the suspension control system 1 according to the first preferred embodiment of the present invention, with reference to FIGS. 6, 7 and 8. The procedures shown in FIGS. 6, 7 and 8 are carried out separately for each of the shock absorbers 2FL, 2FR, 2RL and 2RR at predetermined intervals. The following description is related to any one of the shock absorbers 2FL, 2FR, 2RL and 2RR for the sake of simplicity. The other shock absorbers are controlled in the same way.

FIG. 6 illustrates a damping force altering control procedure (routine) for switching the damping force between the low level (soft) and the high level (hard) by changing the status of the piezoelectric actuator 27 on the basis of the damping force change rate V. FIG. 7 illustrates a frequency detection interrupt procedure (routine) for detecting the number of times that the damping force change rate exceeds a learning reference value VrefG within a predetermined period and for outputting, as information on a frequency N, the detected number of times. FIG. 8 illustrates an alteration reference value learning procedure (routine) for learning an alteration reference value Vref used for actually altering the level of the damping force on the basis of the frequency N. It will be noted that the alteration reference value Vref corresponds to the aforementioned adjustment reference value.

The procedures shown in FIGS. 7 and 8 learn the alteration reference value Vref (VrefG) by referring to a variable C provided for measuring the predetermined period and the frequency N. The procedure shown in FIG. 6 actually alters the setting of the damping force by using the learned alteration reference value Vref.

Referring to FIG. 6, the procedure commences with step 100, at which step the CPU 61 (FIG. 4) inputs the damping force change rate V regarding each shock absorber 2 from the damping force change rate detection circuit 70 via the input interface circuit 67. Next, at step 110, the CPU 61 discerns whether or not the damping force change rate V is greater than the alteration reference value Vref which is learned by the procedure shown in FIG. 8. When the result at step 110 is NO, that is, when the damping force change rate V is equal to or less than the alteration reference value Vref, the CPU 61 determines, at step 120, whether or not a flag FHS indicating that the suspension is set to the soft state is equal to 1. When the result obtained at step 120 is NO, at step 130, the CPU 61 controls the suspension so that it is altered to the hard state, and ends the procedure. It will be noted that immediately after the damping force of the shock absorber 2 is altered from the low level (soft state) to the high level (hard state), the output interface circuit 68 controls the corresponding high-voltage application circuit 75 under the control of the CPU 61 so that a voltage of −100 volts is applied to the corresponding piezoelectric actuator 27 so that it is contracted. If the corresponding piezoelectric actuator 2 is in the contracted state, the piezoelectric acturator 27 is maintained in this state.

On the other hand, when it is determined, at step 110, that the damping force change rate V is greater than the alteration reference value Vref, the CPU 61 resets a timer variable T to zero at step 140. At step 150 subsequent to step 140, the CPU 61 sets the flag FHS to 1, which represents that the suspension should be set to the soft state. At step 160, under the control of the CPU 61, the output interface circuit 68 controls the corresponding high-voltage application circuit 75 so that it applies a voltage of +500 volts to the corresponding piezoelectric actuator 27 so that the damping force of the shock absorber 2 is set to the low level (soft). Then, the procedure is terminated.

If the damping force change rate V is greater than the alteration reference value Vref after the damping force of the shock absorber 2 is altered to the low level, a sequence of steps 140, 150 and 160 is repeatedly carried out. When it is determined, at step 110, that the damping force change rate V has become equal to or less than the alteration reference value Vref, the CPU 61 checks the status of the flag FHS at step 120, and determines, at step 170, whether or not the timer variable T exceeds a predetermined reference value TS. The reference value TS is provided for maintaining the shock absorber 2 at the low level for a predetermined time after it is altered to the low level. If the timer variable T is equal to or less than the reference value TS, the CPU 61 increments the timer variable T by +1 and executes step 160. Thus, the suspension is maintained in the soft state.

If the damping force change rate V is always equal to or less than the alteration reference value Vref for the predetermined time (which corresponds to TS) after the damping force change rate V becomes equal to or less than the alteration reference value Vref, the determination result obtained at step 170 becomes YES. Then, the CPU 61 resets the flag FHS to zero at step 190, and controls the shock absorber 2 so that it provides the high-level damping force (hard state) at step 130.

While the procedure shown in FIG. 6 is repeatedly carried out, the damping force of the shock absorber 2 is altered to the low level immediately after the damping force change rate V exceeds the alteration reference value Vref, and maintained at the low level for the predetermined time corresponding to TS. When the predetermined time TS elapses in the state where the damping force change rate V is equal to or less than the alteration reference value Vref, the damping force is altered to the high level.

A description will now be given of the interrupt procedure (FIG. 7) for detecting the frequency N used for determining the alteration reference value Vref, which value is referred to during the procedure shown in FIG. 6. The procedure shown in FIG. 7 commences with step 200, at which step the CPU 61 increments the aforementioned variable C by +1. The variable C indicates the number of times that the procedure shown in FIG. 7 is activated. At subsequent step 210, the CPU 1 discerns whether the suspension is in the soft state or hard state. It will be noted that the setting of the damping force of the shock absorber 2 is controlled by the aforementioned procedure shown in FIG. 6. When it is determined, at step 210, that the current status of the shock absorber 2 is in the low level (soft state), at step 212, the CPU 61 multiplies the current alteration reference value Vref by 0.8×0.5 and inserts Vref ×0.8 ×0.5 into the learning reference value VrefG. On the other hand, when it is determined, at step 210, that the current status of the shock absorber 2 is in the high level (hard state), at step 214, the CPU 61 multiplies the current alteration reference value Vref by 0.8 and inserts Vref×0.8 into the learning reference value VrefG. The above-mentioned coefficients to be multiplied by the alteration reference values are not limited to 0.8×0.5 and 0.8, but arbitrarily selected on the basis of experimental results.

After the learning reference value VrefG is obtained for each of the hard and soft states in the above-mentioned way, the CPU 61 determines, at step 220, whether or not the current damping force change rate V is greater than the learning reference value VrefG. If the current damping force change rate V is equal to or lower than the learning reference value VrefG, the CPU 61 resets a flag FF to zero at step 230, and then ends the procedure shown in FIG. 7. The flag FF indicates whether or not the current damping force change rate V is greater than the alteration reference value Vref.

On the other hand, when it is determined, at step 220, that the current damping force change rate V is greater than the learning reference value VrefG, the CPU 61 checks the value of the flag FF at step 240. When it is determined, at step 240, that the flag FF is equal to zero, that is, immediately after the current damping force change rate V has become greater than the learning reference value VrefG, the CPU 61 increments the frequency N by +1 at step 250, and then sets the flag FF to 1 at step 260. Then, the procedure shown in FIG. 7 is ended. In this manner, the frequency N is incremented by +1 only immediately after the damping force change rate V has become greater than the learning reference value VrefG. That is, the frequency N is not increased until the damping force change rate V becomes equal to or less than the alteration reference value VrefG and then becomes greater than the alteration reference value VrefG again.

The procedure shown in FIG. 7 is repeatedly carried out so that the learning reference value VrefG is renewed on the basis of the alteration reference value Vref, and the frequency N at which the damping force change rate V becomes greater than the learning reference value VrefG within the predetermined period is obtained.

The alteration reference value learning procedure (routine) will now be explained with reference to FIG. 8. The procedure shown in FIG. 8 commences with step 300, at which step the CPU 61 inputs the signals from the steering sensor 50, the speed sensor 51 and the stop lamp switch 53 via the input interface circuit 67. At subsequent step 310, the CPU 61 obtains the current driving condition from the input signals, and determines, from the obtained current driving condition, whether or not a special control, such as an anti-dive control or an anti-roll control, should be carried out. For example, when the vehicle is being braked or rapidly turned, the CPU 61 concludes that the special control should be carried out. In this case, the CPU 61 changes the alteration reference value Vref to an optimum value suitable for the special control at step 315. After that, the procedure shown in FIG. 8 is ended.

On the other hand, when it is determined, at step 310, that the above-mentioned special control is not needed, the CPU 61 determines, at step 320, whether or not the variable C has become equal to a value i. The variable C is incremented by +1 each time the procedure shown in FIG. 7 is executed. The variable C is provided for determining whether or not the (predetermined) time necessary to obtain the frequency N has elapsed. The procedure shown in FIG. 8 is ended if the number of times that the procedure shown in FIG. 7 has repeatedly been carried out is small (C<i), so that the time necessary to obtain the frequency N has not yet elapsed.

Figure 9:
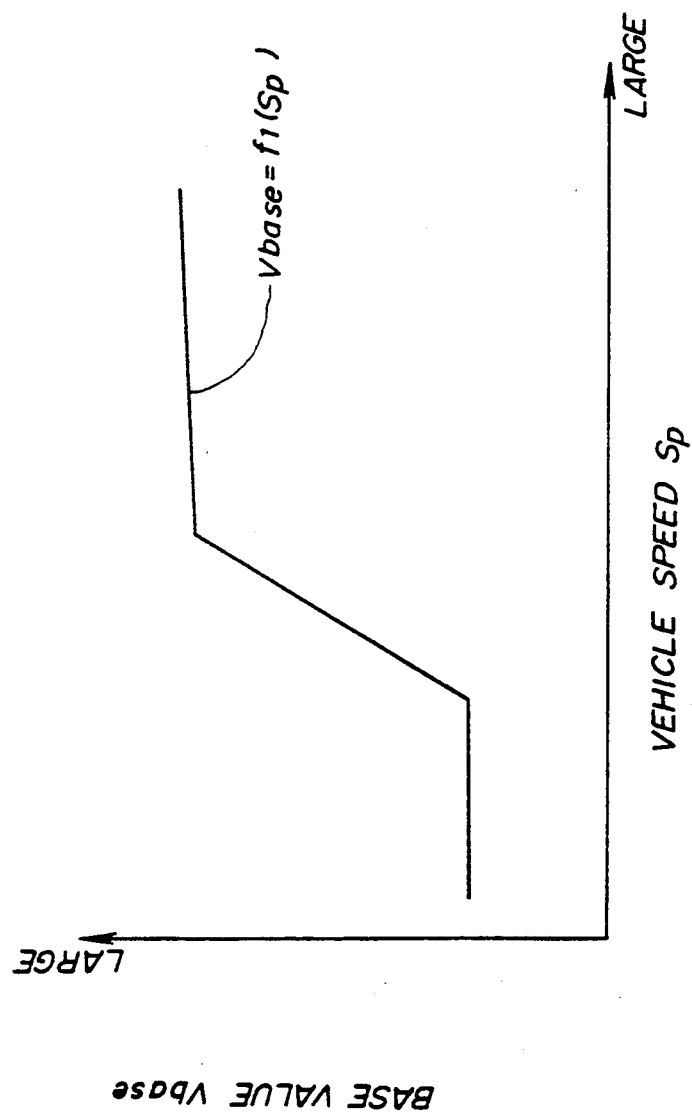
FIG. 9 is a graph illustrating the relationship between a base value of an adjustment (alteration) reference value and vehicle speed.

The determination result at step 320 becomes YES each time the procedure shown in FIG. 7 is carried out i times. When the result at step 320 is YES, the CPU 61 resets the variable C to zero at step 330, and inputs a current vehicle speed Sp at step 340 via the input interface circuit 67. At step 350, the CPU 61 calculates a base value Vbase from the vehicle speed Sp. The base value Vbase is used for adjusting the alteration reference value Vref in accordance with the vehicle speed Sp. As shown in FIG. 9, the base value Vbase is a function of the vehicle speed Sp, $f_1(Sp)$. As also shown in FIG. 9, the base value Vbase is increased with an increase in the vehicle speed Sp.

Turning to FIG. 8, at step 360, the CPU 61 calculates a frequency deviation $\Delta N$ between the frequency N obtained by the procedure shown in FIG. 7 and a target frequency Nref. At step 370, the CPU 61 discerns whether or not the frequency deviation $\Delta N$ is greater than 0. When the frequency deviation $\Delta N$ is greater than 0, a learning correction value $\Delta V$ is incremented by $\beta$ at step 380. On the other hand, when the frequency deviation $\Delta N$ is equal to or less than 0, the learning correction value $\Delta V$ is decremented by $\beta$ at step 390. The learning correction value $\Delta V$ thus calculated is added to the base value Vbase at step 400 so that the alteration reference value Vref is obtained. In this way, the alteration reference value Vref is learned and adjusted on the basis of the vehicle speed Sp. It will be noted that the learning correction value $\Delta V$ is also learned and the learning correction value $\Delta V$ obtained by the learning is stored in the RAM 64, for example, and used in the future control. At step 410 subsequent to step 400, the CPU 61 resets the frequency N to 0 so that it is ready for the next frequency calculation procedure. After that, the procedure shown in FIG. 8 is ended.

By executing the procedures shown in FIGS. 6, 7 and 8, the setting of the damping force of each shock absorber 2 is controlled as follows.

Figure 10A:
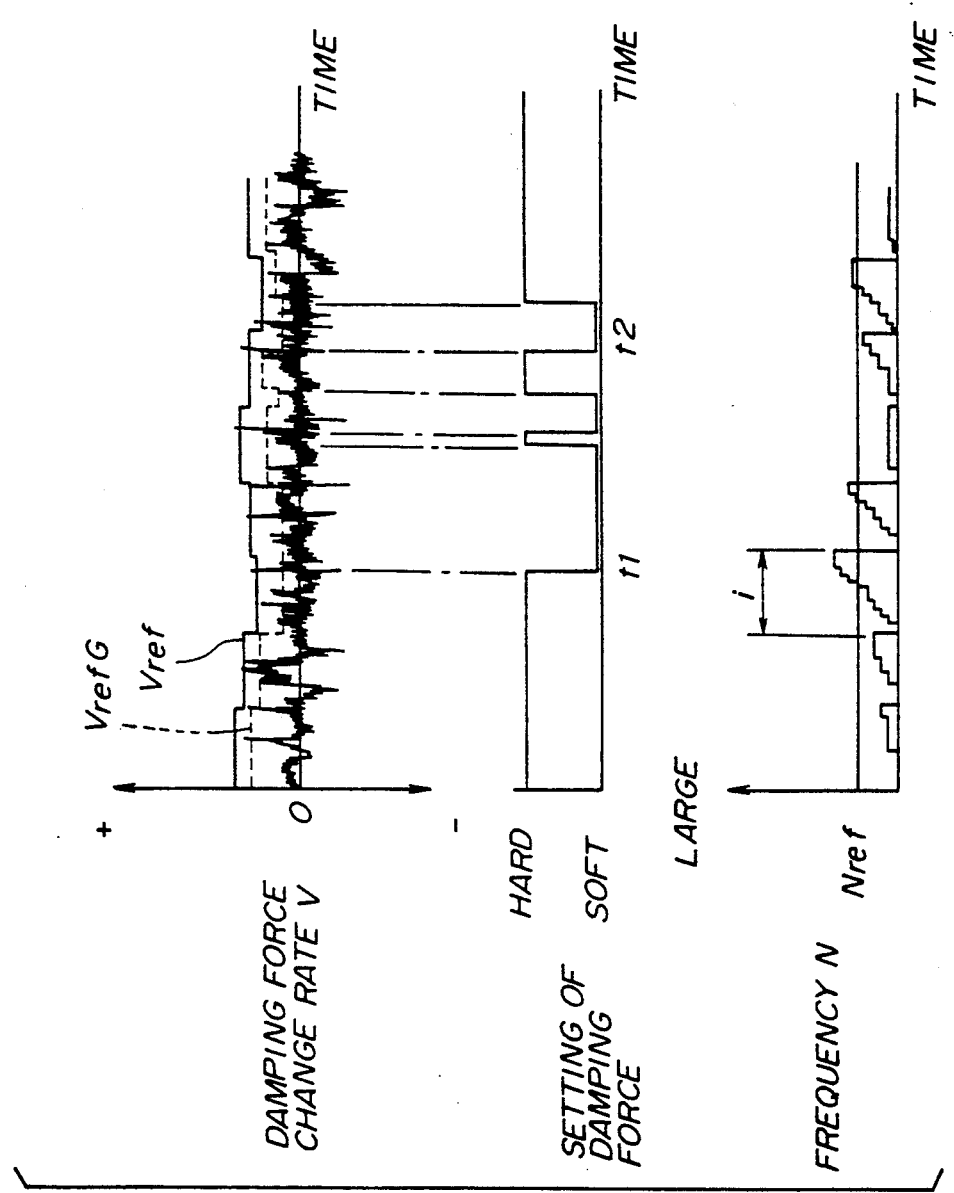
FIG. 10A is a diagram illustrating how the suspension control system according to the first preferred embodiment operates when the vehicle is continuously running on a substantially flat road surface.

Referring to FIG. 10A, there is illustrated an example of the damping force control while the vehicle is continuously running on a flat road surface. In this case, the damping force change rate V does not change greatly, and the damping force of the shock absorber 2 is maintained at the high level (hard state). At this time, the learning reference value VrefG is equal to 80% of the alteration reference value Vref at step 214 shown in FIG. 7. Thus, the frequency N at which the damping force change rate V exceeds the learning reference value VrefG within the predetermined period (which corresponds to the count value i) is low. Thus, the alteration reference value Vref is learned at step 390 so that it is decremented by $\beta$ each time it is determined that $\Delta N \leq 0$ at step 370 shown in FIG. 8. As a result, it becomes easy for the damping force change rate V to exceed the alteration reference value Vref. Thus, the damping force of the shock absorber 2 is altered to the low level due to the presence of a small road surface roughness at times $t_1$ and $t_2$ shown in FIG. 10A, even when the vehicle is running on the flat road surface. As the alteration reference value Vref becomes small at step 212 (FIG. 7), the learning reference value VrefG also becomes small, so that the frequency N at which the damping force change value V exceeds the learning reference value VrefG within the predetermined period becomes high. As a result, the alteration reference value Vref is incremented by $+\beta$. As the above-mentioned procedure is repeatedly carried out, the alteration reference value Vref is learned so that it becomes equal to an appropriate value at which the frequency deviation $\Delta N$ becomes approximately zero.

Thus, when the vehicle is running on the flat road surface and the damping force change rate V is low so that the suspension has a tendency to be set to the hard state, the alteration reference value Vref is gradually decreased by the detection of the frequency N, the renewal of the alteration reference value Vref and the learning of the learning reference value VrefG. As a result, it becomes easy to alter the damping force of the shock absorber 2 to the low level, that is, alter the suspension to the soft state. Thus, it becomes possible to absorb the occurrence of a vibration caused by a small roughness on a continuously flat road surface, so that ride comfort is improved.

Figure 10B:
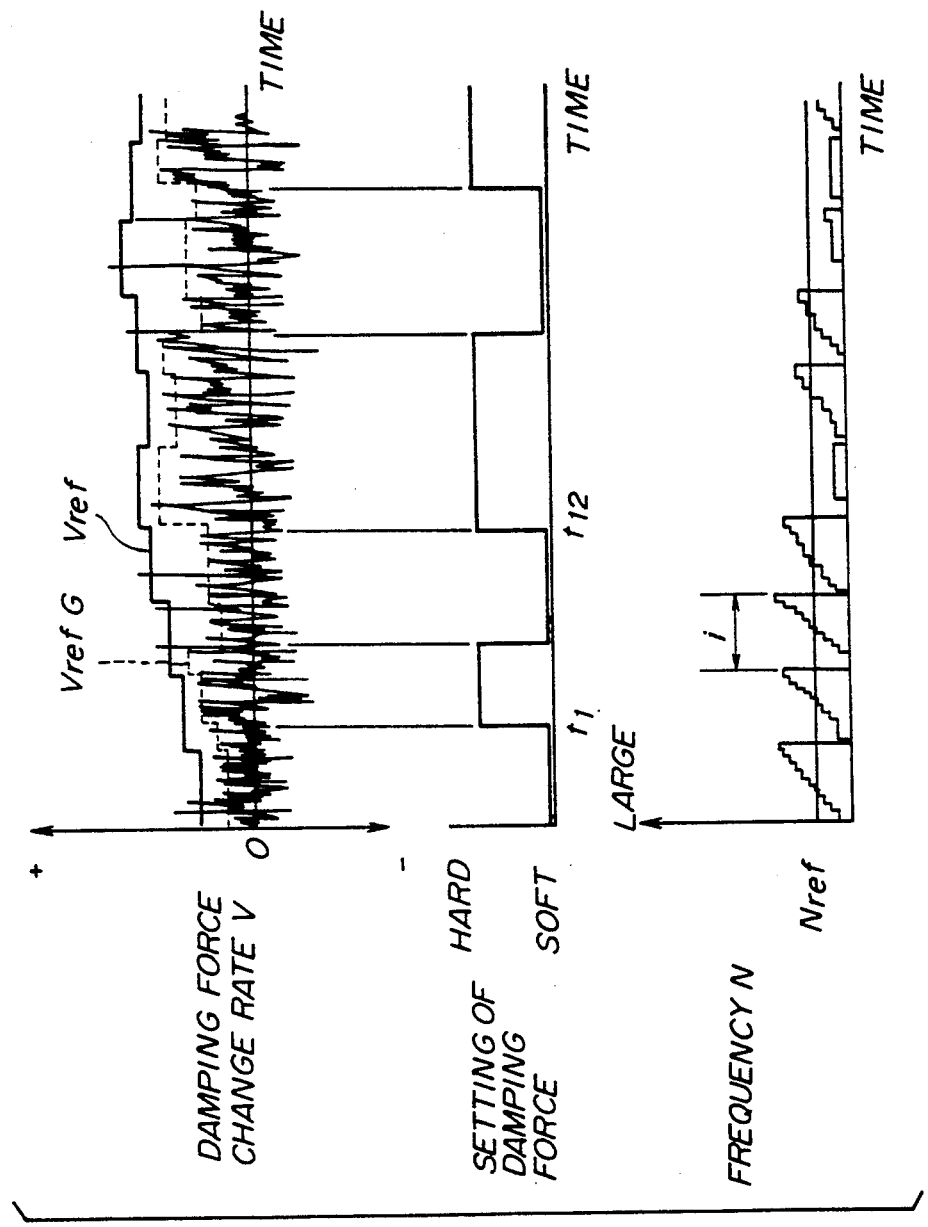
FIG. 10B is a diagram illustrating how the suspension control system according to the first preferred embodiment of the present invention operates when the vehicle is continuously running on a rough road surface.

On the other hand, when the vehicle is running on a rough road surface, as shown in FIG. 10B, the damping force change rate V changes greatly and the suspension is maintained in the soft state. During this time, the learning reference value VrefG is set equal to 40% of the alteration reference value Vref at step 212 shown in FIG. 7. Thus, the frequency N at which the damping force change rate V exceeds the alteration reference value Vref within the predetermined period (which corresponds to the count value i) is high. As a result, the alteration reference value Vref is incremented by $\beta$ at step 380 each time it is determined that $\Delta N > 0$. Thus, it gradually becomes difficult for the damping force change rate V to exceed the alteration reference value Vref, so that the damping force is altered to the high level (hard state) at times $t_{11}$ and $t_{12}$ shown in FIG. 10B, even when the vehicle is running on the rough road surface. As the alteration reference value Vref is increased in the above-mentioned way, the learning reference value VrefG is also increased. Thus, the frequency N at which the damping force change rate V exceeds the learning reference value VrefG becomes low. As a result, the alteration reference value Vref is renewed so that it is decreased by $\beta$. As the above-mentioned procedure is repeatedly carried out, the alteration reference value Vref is learned so that it becomes equal to an appropriate value at which the frequency deviation $\Delta N$ is approximately zero.

Thus, even when the vehicle is running on the rough road surface and the damping force change rate V is high so that the suspension has a tendency to be set to the hard state, the alteration reference value Vref is gradually increased in accordance with the detection of the frequency N, the renewal of the alteration reference value Vref and learning of the learning reference value VrefG. As a result, it becomes easy to alter the damping force of the shock absorber 2 to the high level, that is, alter the suspension to the hard state. Thus, it becomes possible to reduce deterioration of the road holding characteristic caused by a continuously rough road surface, so that the driving stability and controllability can be improved.

According to the above-mentioned first embodiment of the present invention, it becomes possible to absorb a small vehicle body vibration caused when the vehicle is running on a continuous flat road surface and improve the road holding characteristic which is deteriorated when the vehicle is running on a continuously rough road surface, so that the riding comfort, the driving stability and controllability are improved. Particularly, it should be appreciated that the present damping force control has a good response characteristic because it is carried out on the basis of the damping force change rate V.

According to the first preferred embodiment of the present invention, it is judged, on the basis of the damping force change rate V, whether the road surface condition is flat or rough. Thus, there is no need for a special sensor directed to detecting the road surface condition, and the procedure for detecting the road surface condition has a good response characteristic. Further, the base value Vbase used for calculating the alteration reference value Vref is obtained from the vehicle speed Sp. Thus, the suspension characteristic is controlled on the basis of the vehicle speed Sp.

It will be noted that several variations may be made within the scope of the first preferred embodiment of the present invention. For example, it is possible to renew the alteration reference value Vref on the basis of the time during which the damping force change rate V is greater than the damping force reference value Vref. It is also possible to renew the alteration reference value Vref on the basis of the time during which the suspension is maintained in the soft state. It is possible to provide the target frequency Nref for each of the wheels 5FL, 5FR, 5RL and 5RR. It is possible to use two frequency reference values Nref respectively provided for the hard and soft states in place of the learning reference values VrefG provided respectively for the hard and soft states.

A description will now be given of a suspension control system according to a second preferred embodiment of the present invention.

Figure 11:
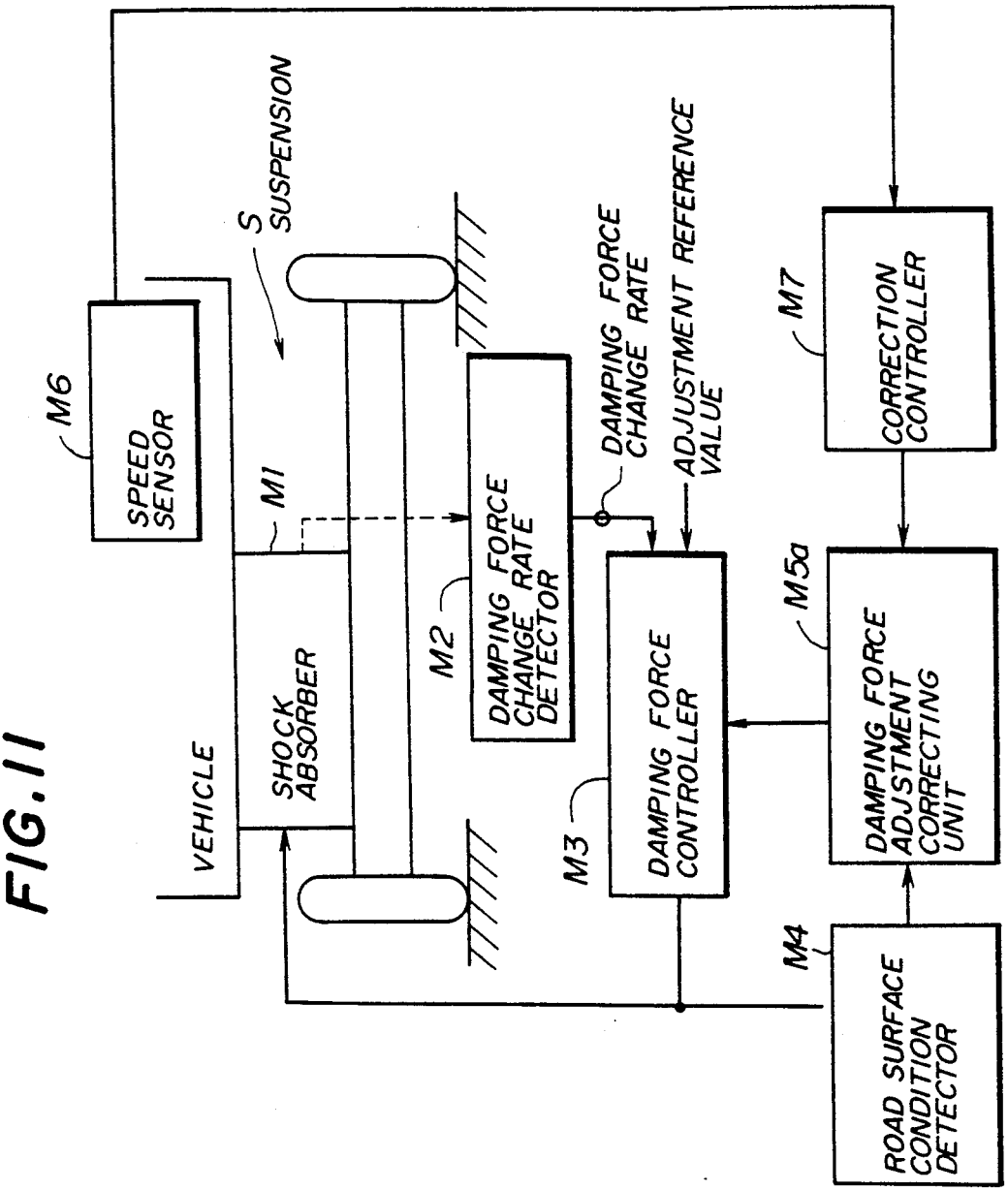
FIG. 11 is a block diagram illustrating the principle of a suspension control system according to a second preferred embodiment of the present invention.

Referring to FIG. 11, there is illustrated the principle of the suspension control system according to the second preferred embodiment of the present invention. In FIG. 11, those parts which are the same as those as shown in FIG. 1 are given the same reference numerals. The suspension control system shown in FIG. 11 has a damping force adjustment correcting unit M5a in place of the damping force adjustment correcting unit M5 shown in FIG. 1, and has a vehicle speed detector M6 and a correction controller M7 in addition to the configuration shown in FIG. 1. In the first embodiment of the present invention, the target frequency Nref is fixed. According to the second embodiment of the present invention, the target frequency Nref is changed in accordance with the vehicle speed Sp by the correction controller M7 so that it decreases with an increase in the vehicle speed Sp. Thus, the alteration reference value Vref is increased with an increase in the vehicle speed Sp, so that it becomes difficult for the shock absorber M1 to be altered to the soft state. As a result, the suspension characteristic is changed so that the driving stability and controllability is increased with an increase in the vehicle speed Sp. The other configurations and operations of the second embodiment of the present invention are the same as those of the first embodiment of the present invention.

Figure 12:
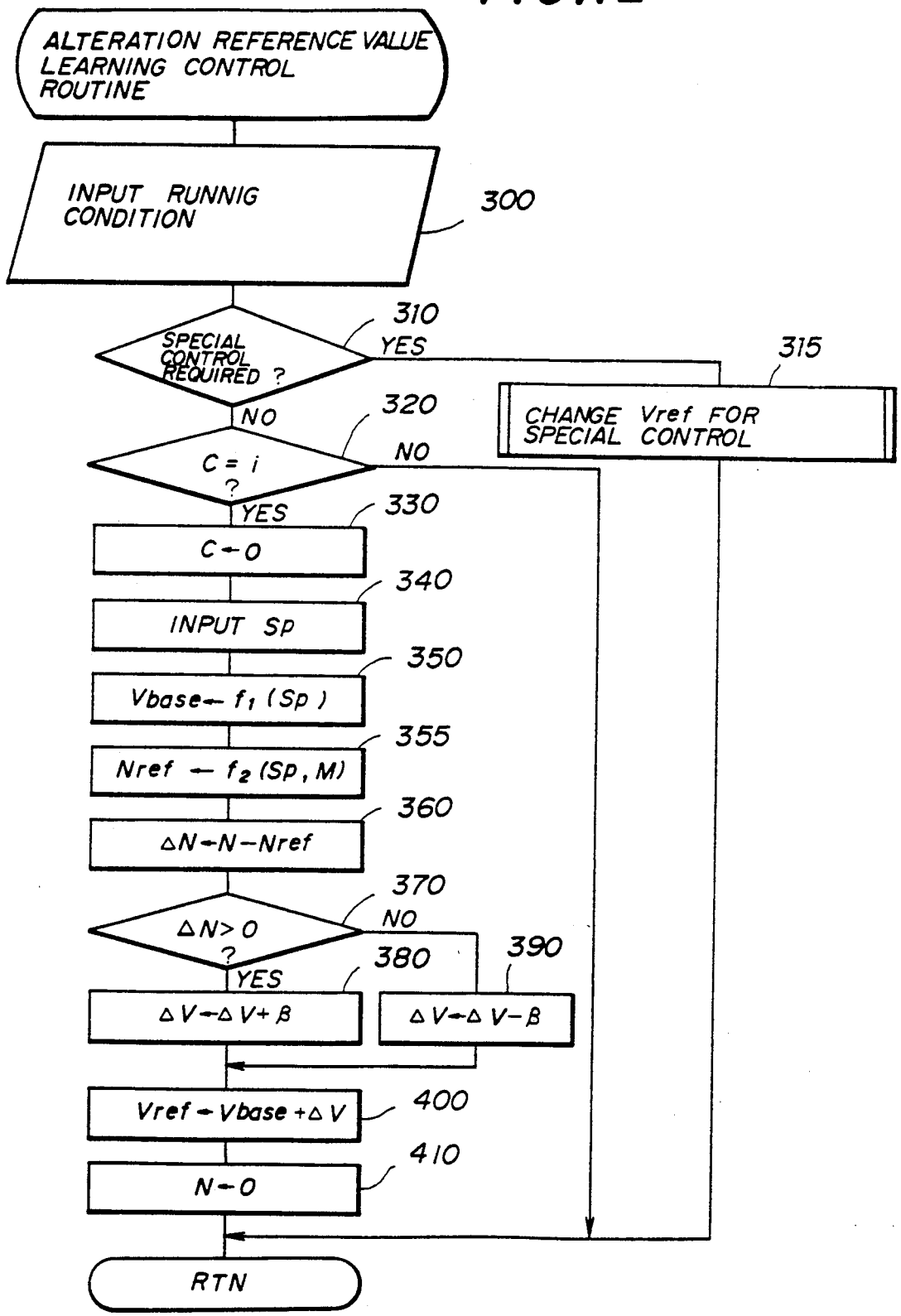
FIG. 12 is a flowchart illustrating a specific operation of the suspension control system shown in FIG. 11.

The configuration shown in FIG. 11 is realized by only slightly modifying the procedure shown in FIG. 7 as follows. Referring to FIG. 12, there is illustrated a procedure for learning the alteration reference value Vref. In FIG. 12, those steps which are the same as those shown in FIG. 7 are given the same reference numerals. Step 355 is provided between steps 350 and 360. That is, after the base value Vbase is calculated from the vehicle speed Sp, at step 355, the target frequency Nref is calculated on the basis of the vehicle speed Sp.

As shown in FIG. 12, the target frequency Nref is a function of the vehicle speed Sp, $f_2(Sp)$, and is stepwise decreased with an increase in the vehicle speed Sp. As will be described in detail later, FIG. 12 illustrates a curve F representing the function $f_2(Sp)$ for the front wheels 5FL and 5FR and a curve R representing the function $f_2(Sp)$ for the rear wheels 5RL and 5RR. That is, the function $f_2(S)$ for the front wheels 5FL and 5FR is different from that for the rear wheels 5RL and 5RR. However, it is also possible to use in common a single function $f_2(Sp)$ for the four wheels.

According to the second embodiment of the present invention, special advantages are presented in addition to the advantages presented by the first embodiment of the present invention. When the vehicle is continuously running on a flat road surface at low speeds, the alteration reference value Vref is learned so that it decreases on the basis of the frequency deviation ΔN. Thus, it becomes easy for the damping force change rate V to exceed the alteration reference value Vref. That is, it is easy for the suspension to be altered to the soft state. Thus, the riding comfort can be improved. On the other hand, when the vehicle is continuously running on the flat road surface at high speeds, the alteration reference value Vref is learned so that it increases on the basis of the frequency deviation ΔN because the base value Vbase is increased with an increase in the vehicle speed Sp and the target frequency Nref is decreased with an increase in the vehicle speed Sp. Thus, the driving stability and controllability at high speeds can be improved.

On the other hand, when the vehicle speed is increasing while running on a continuously rough road surface, the alteration reference value Vref is learned so that it increases. Thus, it actually becomes difficult for the damping force alteration rate V to exceed the alteration reference value Vref, and it becomes difficult for the suspension to be altered to the soft state. Thus, as the vehicle speed is increasing, the suspension characteristic is changed so that the driving stability and controllability are improved.

Figure 13:
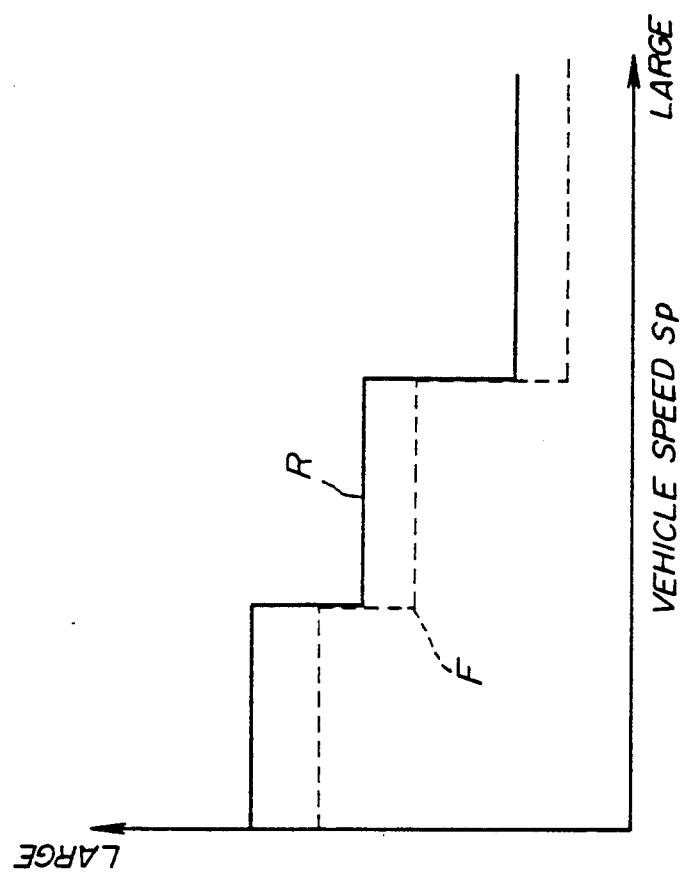
FIG. 13 is a graph illustrating the relationship between a target frequency and vehicle speed.

As has been described previously, the target frequency Nref is provided in common for the four wheels 5FL, 5FR, 5RL and 5RR. Alternatively, it is possible to provide a single target frequency Nref for the front wheels 5FL and 5FR and to provide another target frequency Nref for the rear wheels 5RL and 5RR, as shown in FIG. 13.

In many cases, the suspension type, the share of a vehicle weight and/or the damping characteristic for the front wheels 5FL and 5FR are different from those for the rear wheels 5RL and 5RR. In these cases, if all the shock absorbers 2 are controlled by using the same target frequency Nref, there is an imbalance between the alteration of the damping force level regarding the front wheels 5FL and 5FR and the alteration of the damping force level regarding the rear wheels 5RL and 5RR. For example, the correction of the alteration reference values Vref with respect to the front wheels 5FL and 5FR is terminated before they are increased to appropriate values and, on the other hand, the correction of the alteration reference values Vref with respect to the rear wheels 5RL and 5RR is terminated before they are decreased to appropriate values. In this case, it is easy for the suspensions regarding the front wheels 5FL and 5FR to be altered to the soft state, while it is difficult for the suspensions regarding the rear wheels 5RL and 5RR to be altered to the soft state.

In order to overcome the above-mentioned problem, as shown in FIG. 9, the target frequency Nref regarding the front wheels 5FL and 5FR is selected so that it is smaller than that regarding the rear wheels 5RL and 5RR. By using these target alteration frequencies Nref, the alteration reference value Vref regarding the front wheels 5FL and 5FR is increased and, on the other hand, the alteration reference value Vref regarding the rear wheels 5RL and 5RR is decreased. Thus, it becomes possible to eliminate the aforementioned imbalance.

Figure 14:
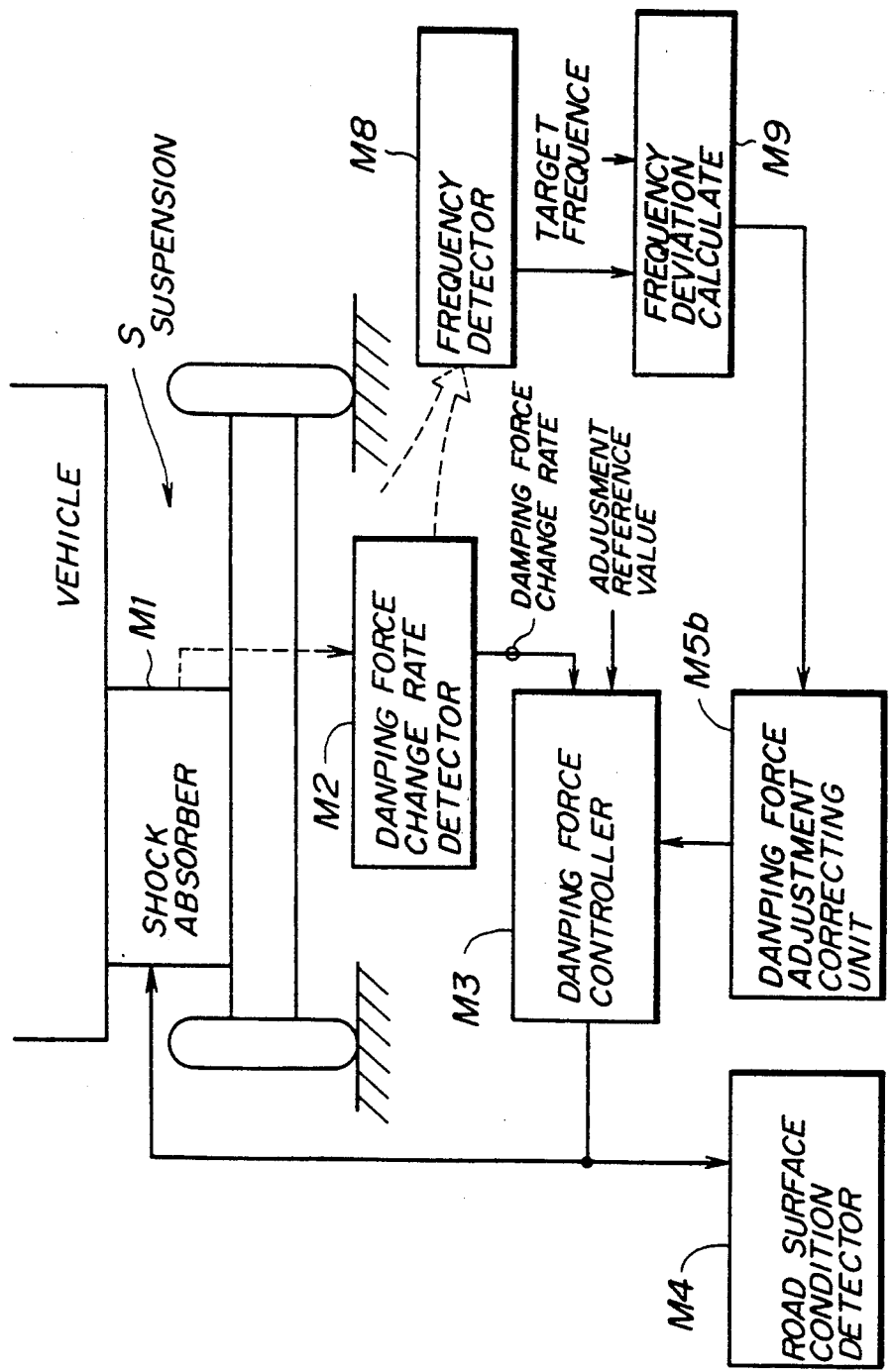
FIG. 14 is a block diagram illustrating the principle of a suspension control system according to a third preferred embodiment of the present invention.

A description will now be given of a suspension control system according to a third preferred embodiment of the present invention. Referring to FIG. 14, those parts which are the same as those shown in FIG. 1 are given the same reference numerals. A frequency detector M8 detects the frequency of change of a parameter related to the damping force. For example, the frequency detector M8 detects the aforementioned frequency N. Alternatively, it is possible to obtain the frequency of change of the parameter related to the damping force by calculating the number of times that the damping force is actually changed. A frequency deviation calculator M9 calculates the difference between the frequency of change of the parameter and a target frequency, and outputs a frequency deviation. For example, the frequency deviation calculator M9 calculates the deviation between the alteration frequency N and the aforementioned target alteration frequency Nref, and outputs the frequency deviation ΔN. A damping force adjustment correcting unit M5b receives the detection signal indicating the road surface condition and a signal indicating the aforementioned frequency deviation ΔN, and corrects the reference value input to the damping force controller M3, such as the aforementioned alteration reference Vref, so that the deviation calculated by the frequency deviation calculator M9, such as the frequency deviation ΔN, becomes zero.

In the case where a shock absorber capable of continuously changing the damping force is used, the frequency detector M8 detects the number of times that the damping force is set to be equal to or greater than a predetermined damping force level.

In the case where the vehicle having a shock absorber providing discrete damping force levels is continuously running on a flat road surface for a predetermined period or longer, the damping force adjustment correcting unit M5b decreases the reference value input to the damping force controller M3 by a correction amount based on the frequency deviation ΔN. The correction amount increases with an increase in the frequency deviation ΔN. Similarly, in the case where the vehicle is running on a rough road surface for the predetermined period or longer, the damping force adjustment correcting unit M5b increases the reference value input to the damping force controller M3 by a correction amount based on the frequency deviation ΔN. The correction amount increases with an increase in the frequency deviation ΔN. As a result the suspension can provide balanced shock absorbing and road holding characteristics.

In the case where the vehicle has a shock absorber providing the continuously variable damping force, the damping force adjustment correcting unit M5b instructs the damping force controller M3 so that the damping force is simply increased or decreased by a correction amount corresponding to the frequency deviation ΔN.

Figure 15:
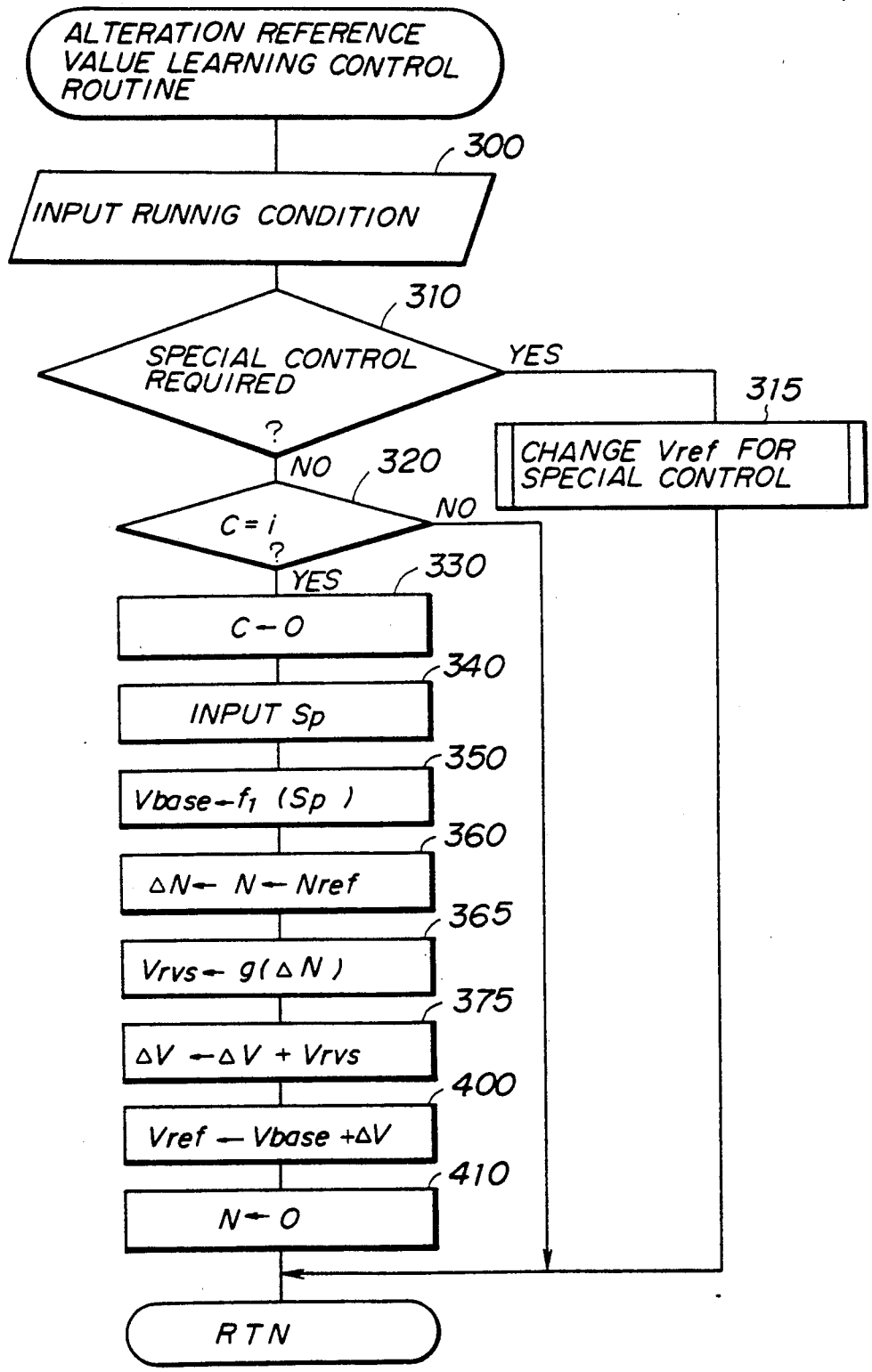
FIG. 15 is a flowchart illustrating a specific operation of the suspension control system shown in FIG. 14.
Figure 16:
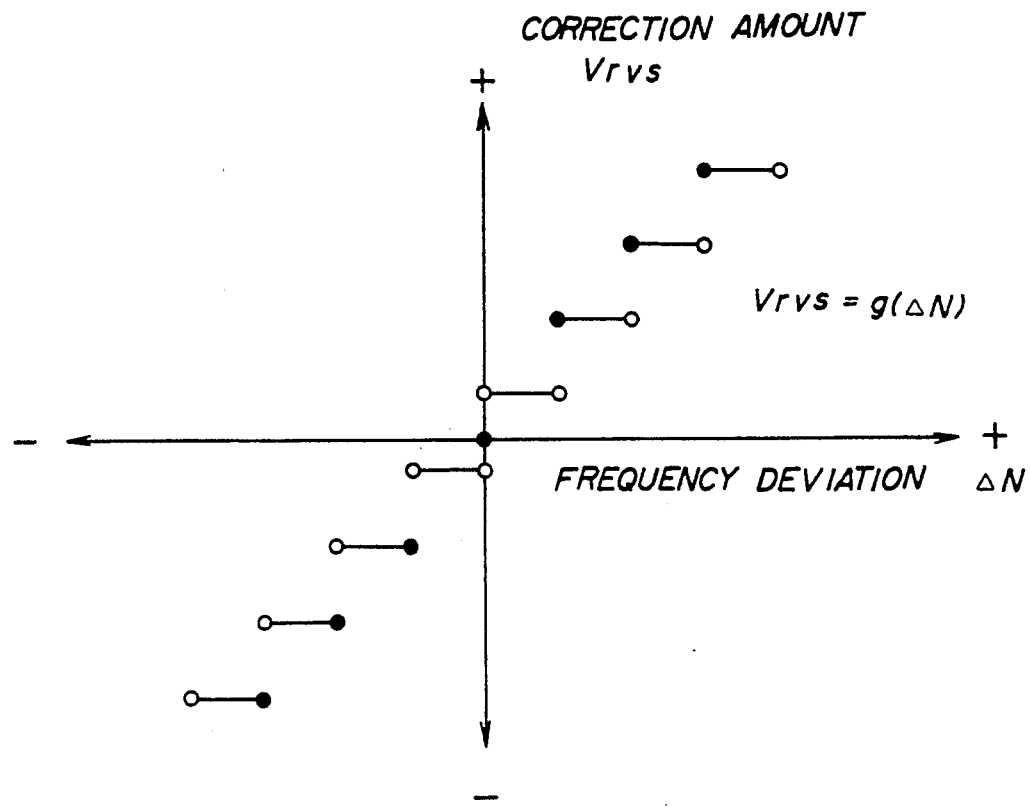
FIG. 16 is a graph illustrating the relationship between a correction amount and a frequency deviation.

The arrangement shown in FIG. 14 is realized by modifying the alteration reference value learning routine shown in FIG. 8, as shown in FIG. 15, in which those steps which are the same as those shown in FIG. 8 are given the same reference numerals. Steps 365 and 375 shown in FIG. 15 are substituted for steps 370, 380 and 390 shown in FIG. 8. After calculating the frequency deviation $\Delta N$ between the target frequency Nref and the current frequency N obtained by the procedure shown in FIG. 7, step 365 is executed. At step 365, the CPU 61 shown in FIG. 3A calculates a correction amount Vrvs from the frequency deviation $\Delta N$. The correction amount Vrvs defines how much the alteration reference value Vref should be changed at one time. As shown in FIG. 16, the correction amount Vrvs is a function of the frequency deviation $\Delta N$, $g(\Delta N)$. When the current frequency N is higher than the target frequency Nref, the correction amount Vrvs has a positive value, which increases with increase in $\Delta N$. When the current frequency N is lower than the target frequency Nref, the correction amount Vrvs has a negative value, which negatively increases with a negative increase in $\Delta N$.

After that, at step 375, the CPU 61 renews the learning correction value $\Delta V$ by adding the correction amount Vrvs to the current learning correction value $\Delta V$. It will be noted that if the current frequency N is higher than the target alteration frequency Nref, the learning correction value $\Delta V$ is increased. In this case, the greater the frequency deviation $\Delta N$, the greater the correction amount Vrvs. On the other hand, when the current frequency is equal to or lower than the target frequency Nref, the learning correction value $\Delta V$ is decreased. In this case, the correction amount Vrvs increases negatively as the frequency deviation $\Delta N$ increases negatively. After that, at step 400, the learning correction value $\Delta V$ is added to the base value Vbase, which is the function of the vehicle speed Sp, as described previously with reference to FIG. 9.

According to the above-mentioned third embodiment of the present invention, the following advantage is obtained in addition to the aforementioned advantages presented by the first embodiment of the present invention. That is, since the learning correction value $\Delta V$, determined each time the procedure shown in FIG. 15 is carried out, is based on the frequency deviation $\Delta N$, the learning is rapidly carried out, so that the alteration reference value Vref is rapidly changed to an appropriate value.

Figure 17:
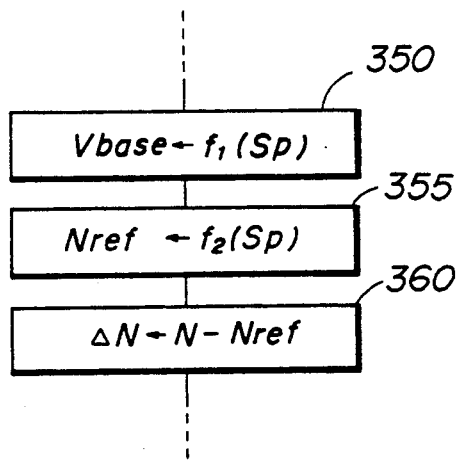
FIG. 17 is a flowchart illustrating an essential part of a variation of the operation shown in FIG. 15.

FIG. 17 illustrates an essential part of a variation of the aforementioned third embodiment of the present invention. According to the variation, step 355 is added between steps 350 and 360 shown in FIG. 15. Step 355 shown in FIG. 17 is the same as step 355 shown in FIG. 12. That is, the target alteration frequency Nref is changed in accordance with the vehicle speed Sp. As has been described previously, there is a tendency for the damping force alteration rate V obtained when the vehicle is running at a high speed to be less than that obtained when the vehicle is running at a low speed. For this reason, as shown in FIG. 13, the target frequency N is decreased with an increase in the vehicle speed Sp, whereby the alteration reference value Vref is learned so that it becomes greater at high speeds. As a result, the control to facilitate the alteration of the damping force to the soft state, which is carried out when the vehicle is running on the flat road surface, is suppressed with an increase in the vehicle speed Sp. Thus, the driving stability and controllability at high speeds can be improved.

Another variation of the third embodiment of the present invention may be made. For example, it is possible to employ a three-dimensional map which defines the relationship among the correction amount Vrvs, the alteration frequency deviation $\Delta N$ and the vehicle speed Sp. It is also possible to obtain the frequency deviation $\Delta N$ on the basis of the number of times that the damping force is actually altered. It is further possible to define the target frequency Nref regarding the front wheels 5FL and 5FR separately from that regarding the rear wheels 5RL and 5RR, as shown in FIG. 13.

Figure 18:
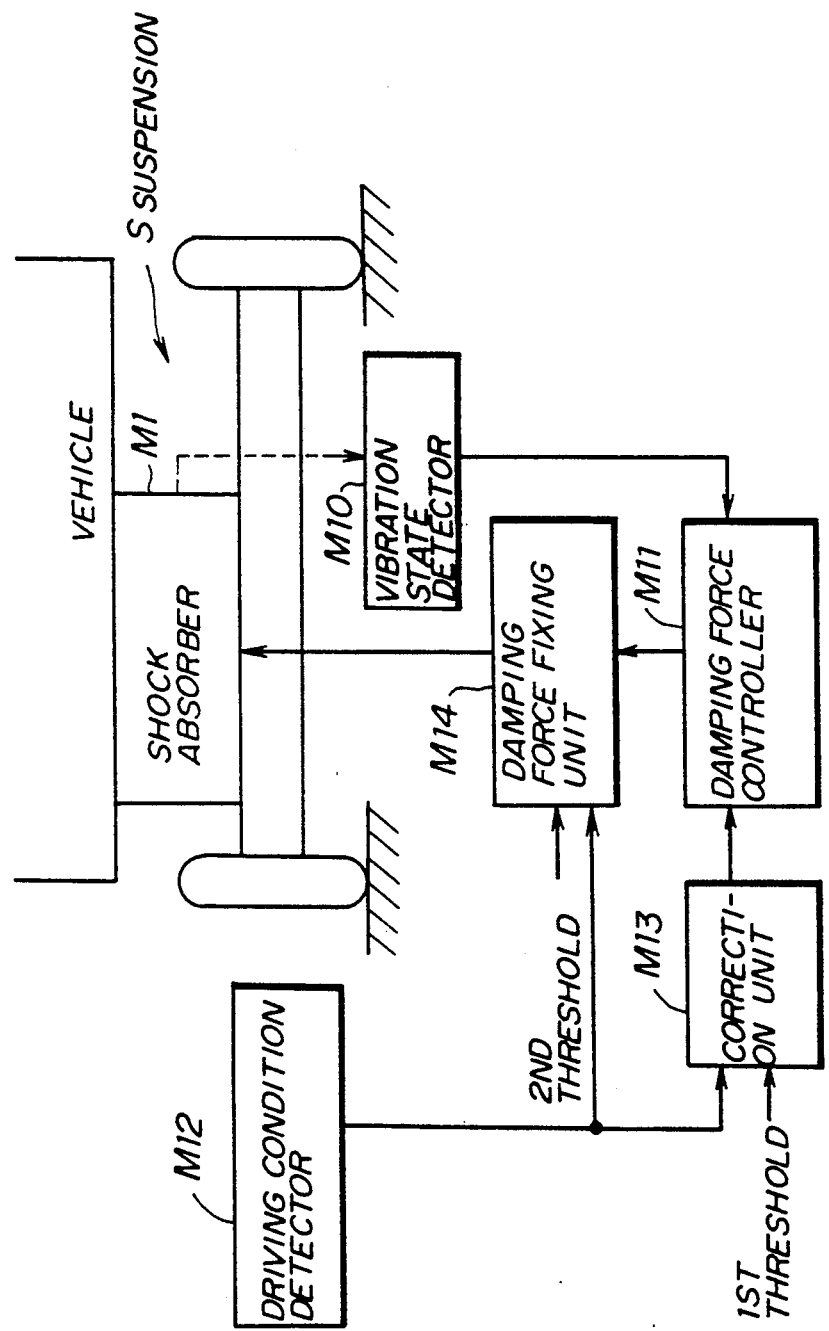
FIG. 18 is a block diagram illustrating the operation of a suspension control system according to a fourth preferred embodiment of the present invention.

A description will now be given of a suspension control system according to a fourth preferred embodiment of the present invention. Referring to FIG. 18, there is illustrated the principle of the suspension control system according to the fourth preferred embodiment of the present invention. A vibration state detector M10 detects a vibration state of the vehicle on the basis of, for example, the damping force change rate V. That is, the vibration state detector M10 corresponds to the aforementioned damping force change detector M2. A damping force controller M11 controls the setting of the shock absorber M1 on the basis of the vibration state of the vehicle (damping force change rate) and a correction signal generated and output by a correction unit M13. A driving condition detector M12 detects a driving condition of the vehicle which causes a tilt of the vehicle attitude. The correction unit M13 compares the tilt of the vehicle attitude with a first threshold value, and outputs the correction signal when the tilt of the vehicle attitude exceeds the first threshold value. The correction signal thus generated instructs the damping force controller M11 to control the characteristic of the shock absorber M1 so that the suspension becomes harder. In this case, the adjustment reference value is increased. Preferably, as will be described, the adjustment (alteration) reference value is controlled by the learning control as employed in the first, second and third embodiments of the present invention.

The damping force controller M11 outputs a control signal representing the suspension characteristic determined in the above-mentioned manner. A shock absorber characteristic fixing unit M14 receives the tilt of the vehicle attitude and a second threshold value greater than the first threshold value, and determines whether or not the tilt of the vehicle body is greater than the second threshold value. If the determination result is negative, the control signal from the damping force controller M11 passes through the shock absorber characteristic fixing unit M14 and is applied to the shock absorber M1. As a result, the suspension characteristic is set so that riding comfort is improved. On the other hand, if the tilt of the vehicle attitude is greater than the second threshold value, the shock absorber characteristic fixing unit M14 fixes the suspension characteristic to the hard state irrespective of the vibration state. Thus, the suspension characteristic is set so that the driving stability and controllability is improved.

Figure 19:
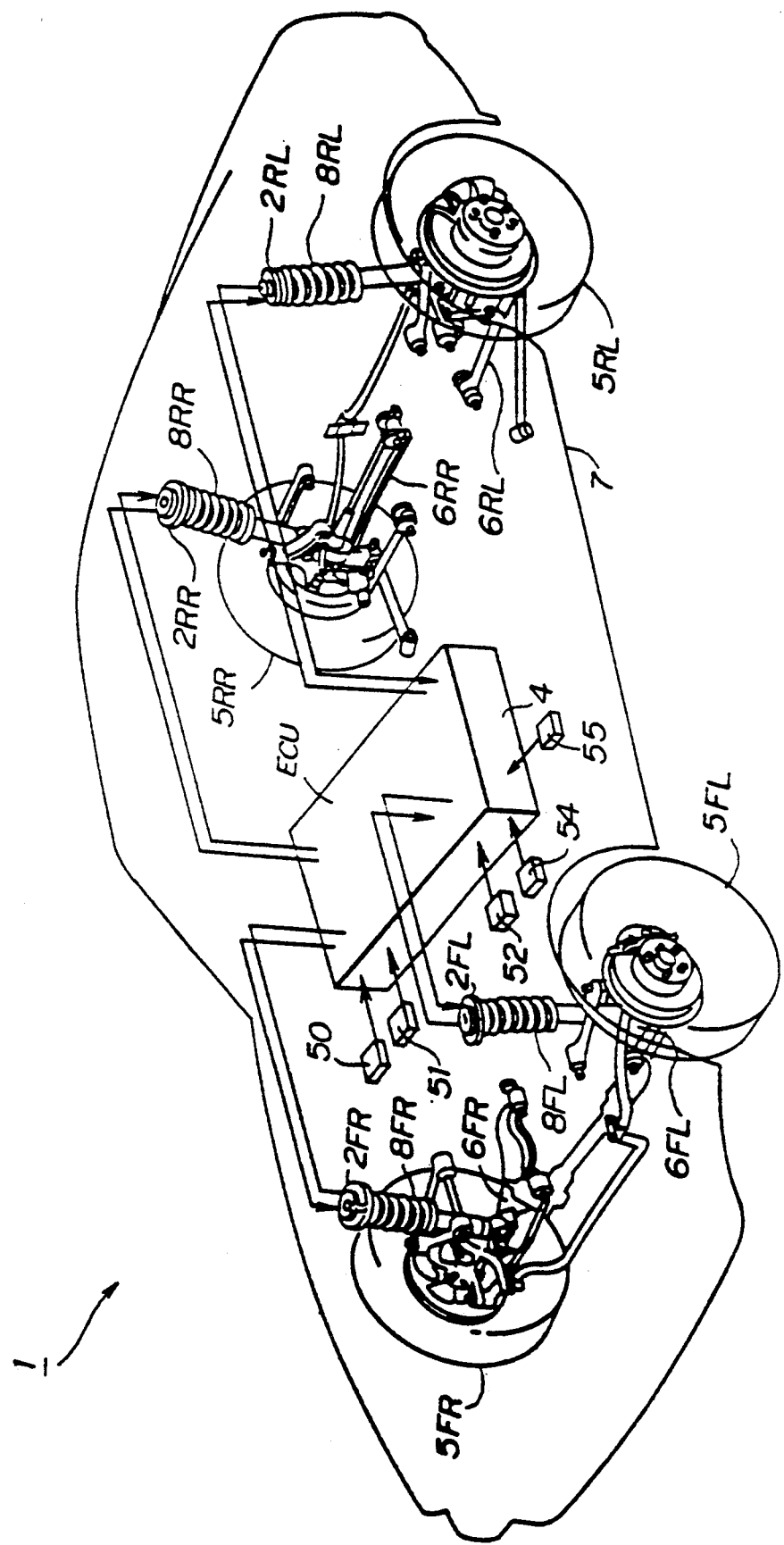
FIG. 19 is a perspective view illustrating a vehicle in which the suspension control system shown in FIG. 18 is installed.

FIG. 19 is a perspective view of a vehicle in which the suspension control system according to the fourth preferred embodiment of the present invention is installed. In FIG. 19, those parts which are the same as those shown in FIG. 2 are given the same reference numerals. The shift position sensor 52 and the stop lamp switch 53 are omitted and therefor a brake oil pressure sensor 54 and a throttle sensor 55 are employed.

Figure 20:
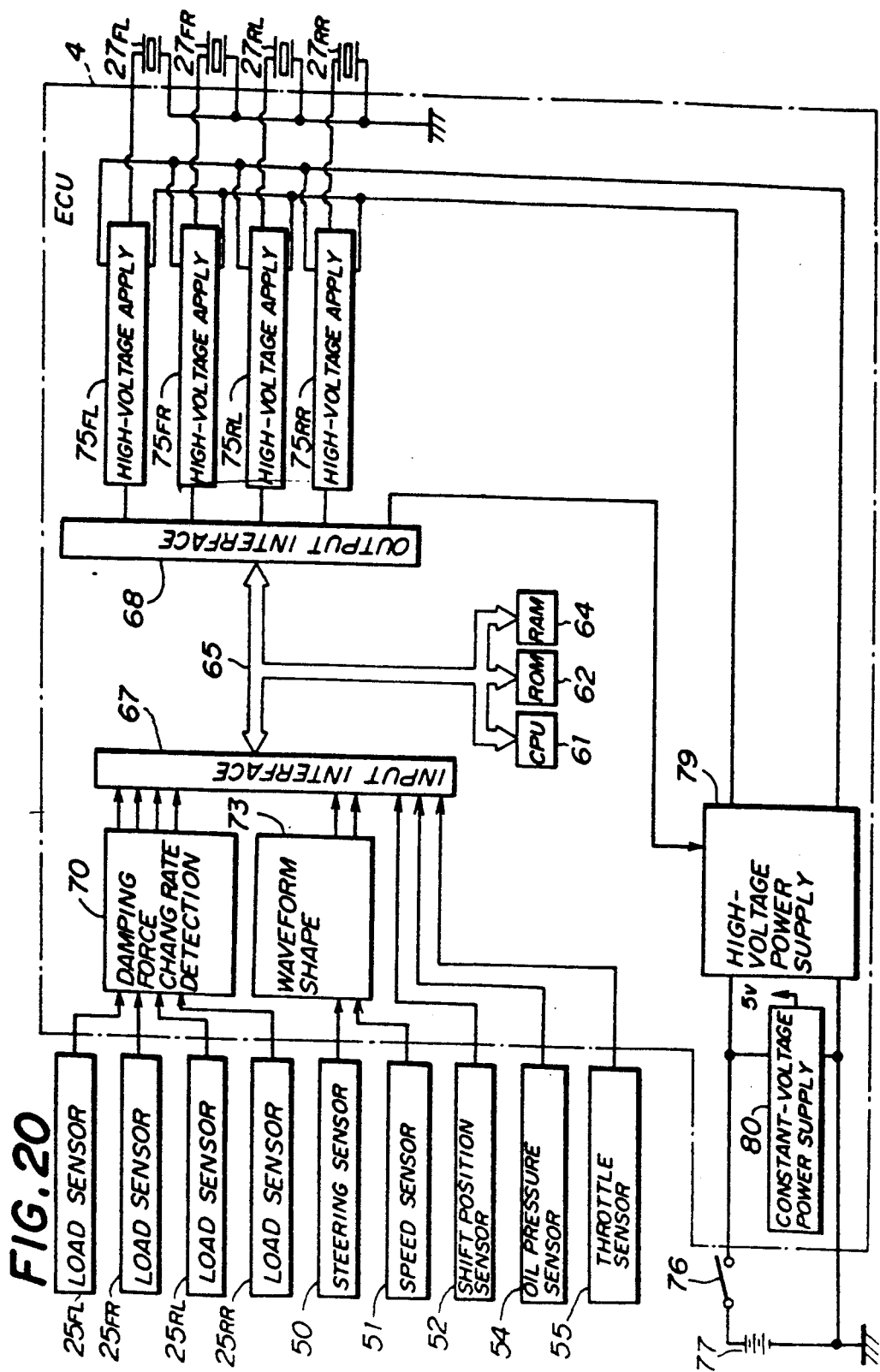
FIG. 20 is a block diagram illustrating a detailed structure of the suspension control system shown in FIG. 18.

FIG. 20 is a detailed block diagram of the structure of the suspension control system shown in FIG. 18. In FIG. 20, those parts which are the same as those shown in FIG. 4 are given the same reference numerals. The brake oil pressure sensor 54 and the throttle sensor 55 are connected to the input interface circuit 67. The indicator 85 shown in FIG. 4 is omitted in FIG. 20. However, it is possible to add the indicator 85 to the structure shown in FIG. 20 in the same way as in FIG. 4.

Figure 21:
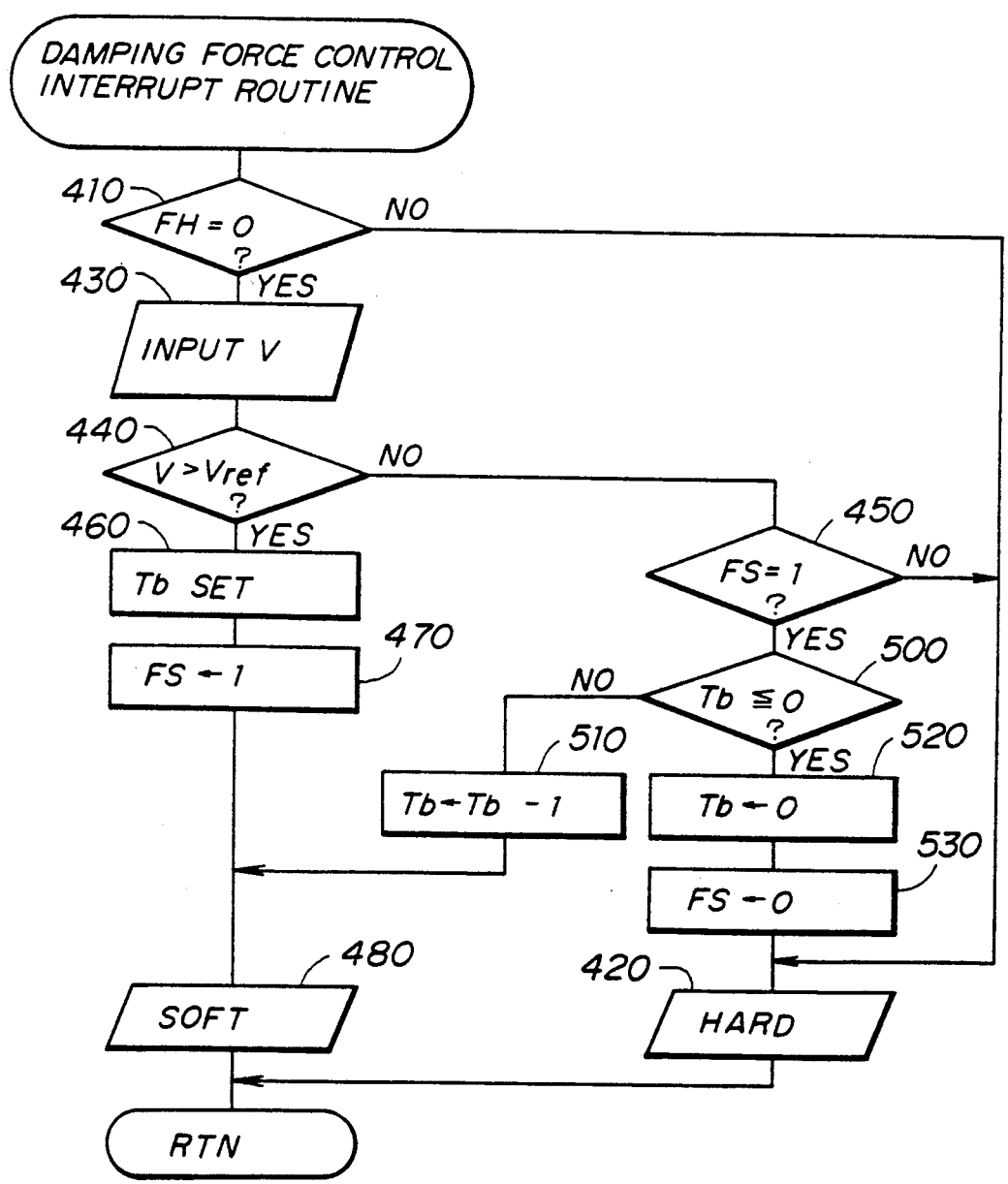
FIGS. 21 and 22 are flowcharts illustrating the operation of the suspension control system shown in FIG. 20.
Figure 22:
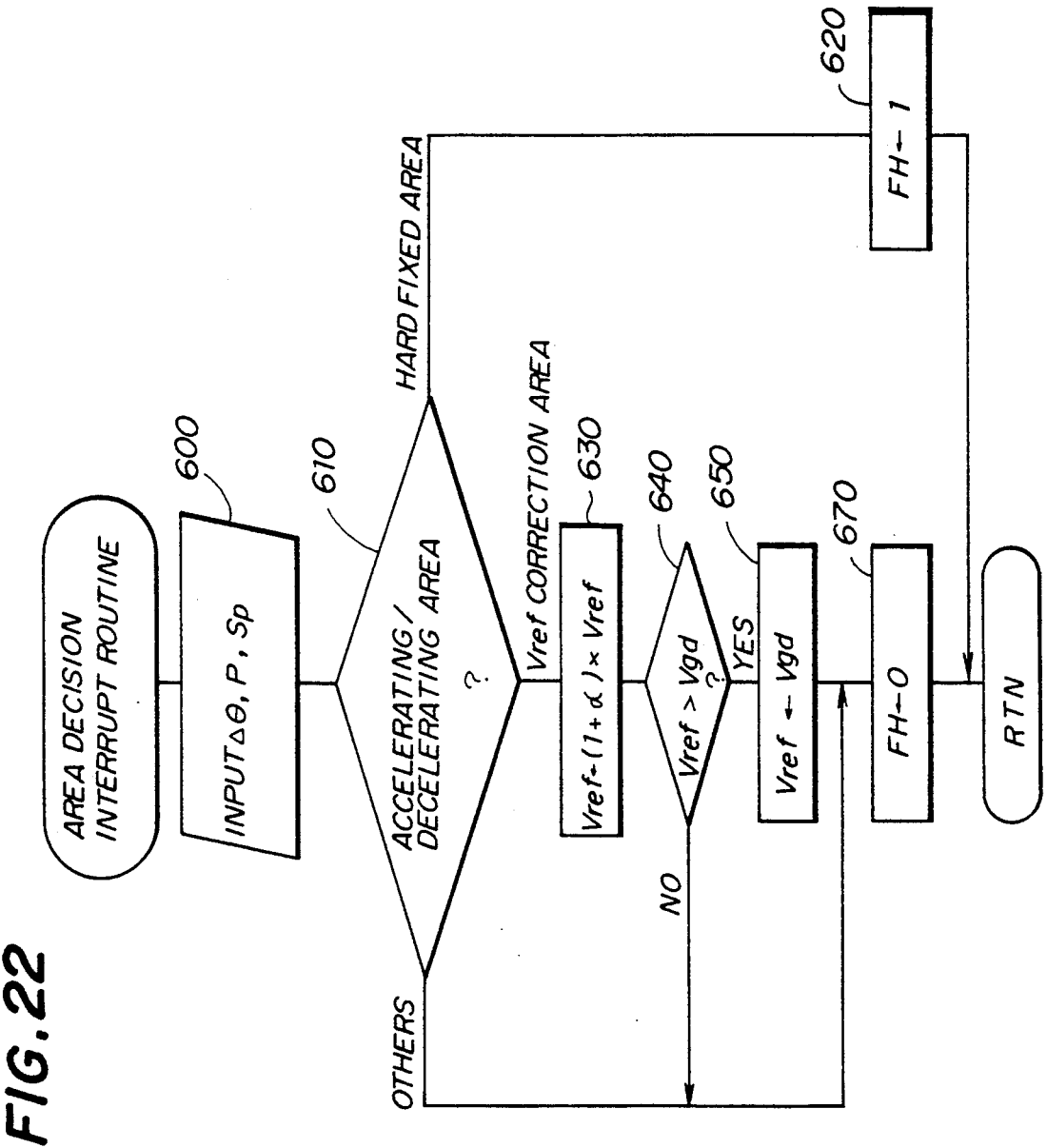

A description will now be given of damping force control according to the fourth embodiment of the present invention with reference to FIGS. 21 and 22. FIG. 21 illustrates a damping force control interrupt procedure (routine), which is carried out at predetermined intervals after an initialization procedure in which flags FS, FF and FH are reset to zero. According to the procedure shown in FIG. 21, the damping force level of the shock absorber 2 is altered on the basis of the damping force change rate V of the shock absorber 2. While executing the procedure shown in FIG. 21, the flag FH, which is set by an area decision interrupt procedure shown in FIG. 22, is referred to. FIG. 22 illustrates the area decision interrupt procedure, which is executed at predetermined intervals which are shorter than those for the procedure shown in FIG. 21. The procedure shown in FIG. 22 determines which one of the predetermined damping force control areas is related to the current driving status, and corrects the alteration reference value Vref or sets the flag FH on the basis of the determined damping force control area.

The procedures shown in FIGS. 21 and 22 are separately carried out for each of the shock absorbers 2FL, 2FR, 2RL and 2RR. It is also possible to fix the damping forces of the front wheels 5FL and 5FR to the high level at the same time. With this arrangement, the driving stability and controllability can be improved.

Referring to FIG. 21, at step 410, the CPU 61 determines whether or not the flag FH is equal to 0. The flag FH is set by the procedure shown in FIG. 22, as will be described in detail later. When it is determined, at step 410, that FH=1, the CPU 6 concludes that the suspension should be set to the hard state. Thus, at step 420, the CPU 61 sets the suspension to the hard state and ends the procedure shown in FIG. 21.

On the other hand, when it is determined that the flag FH is equal to 0, at step 430, the CPU 61 inputs the damping force change rate V related to the shock absorber 2. At step 440, the CPU 61 determines whether or not the damping force change rate V is greater than the aforementioned alteration reference value Vref. The alteration reference value is given an initial value, which is corrected by the procedure shown in FIG. 22. It is preferable that the alteration reference value Vref be learned by using the damping force change rate V in the same way as it is used in the aforementioned first, second and third embodiments of the present invention.

When it is determined, at step 440, that the damping force change rate V is less than or equal to the alteration reference value Vref, the CPU 61 determines whether the flag FS is equal to 1. When the flag FS is equal to 1, it is indicated that the damping force of the shock absorber 2 is in the soft state. When the flag FS is equal to 0, at step 420, the CPU 61 controls the shock absorber 2 so that it is continuously maintained in the hard state.

When it is determined, at step 440, that the damping force change rate V has become greater than the alteration reference value Vref, at step 460, the CPU 61 starts a software timer defined by a timer variable Tb. The timer variable Tb defines how long the shock absorber 2 should be continuously maintained in the soft state from the time when it is switched thereto (V≦Vref). The value of th timer variable Tb may be constant or decrease with an increase in the vehicle speed Sp.

When V>Vref, the shock absorber 2 should be in the soft state. Thus, the flag FS is set to 1 at step 470. At step 480, the CPU 61 controls the shock absorber 2 through the corresponding high-voltage application circuit 75 (FIG. 20) so that a voltage of +500 volts is applied to the corresponding piezoelectric actuator 27. Then the control process ends. Steps 460–480 are repeatedly carried out during the time when V>Vref. When the damping force change rate V has become less than or equal to the alteration reference value Vref, the determination result obtained at step 440 becomes NO. At subsequent step 450, the CPU 61 determines whether or not the flag FS is equal to 1. In a case where the damping force change rate Vref exceeds the alteration reference value Vref and then becomes less than or equal to the alteration reference value Vref, the flag FS is equal to 1. Thus, the determination result at step 450 is YES. At step 500, the CPU 61 determines whether or not the value of the timer variable Tb is less than or equal to 0. When the determination result obtained at step 500 is NO, the value of the timer variable Tb is decremented by +1 at step 510. The shock absorber 2 is set to the soft state at step 480.

On the other hand, the control process proceeds to step 520 when the time defined by the timer variable Tb elapses from the time when it is determined that V≦Vref at step 440. At step 520, the timer variable Tb is reset to 0, and the flag FS is reset to 0 at step 530. At step 420, the damping force of the shock absorber 2 is switched to the hard state. In this step, a voltage of −100 volts is applied to the corresponding piezoelectric actuator 27 (FIG. 20) so that it is contracted. Then the control process ends.

As has been described above, in the case where the predicted rolling is small (FH=0), the damping force of the shock absorber 2 is altered to the low level (soft) immediately after the damping force change rate V has become greater than the alteration reference value Vref. Further, the damping force of the shock absorber 2 is continuously maintained at the low level during the predetermined time (corresponding to the timer variable Tb) from the time when the damping force change rate V has become less than or equal to the alteration reference value Vref. After that, the damping force of the shock absorber 2 is switched to the high level (hard).

The area decision interrupt procedure shown in FIG. 22 will now be explained. The CPU 61 inputs parameters indicating the current driving condition, such as the rate of change of the throttle opening angle Δθ, brake oil pressure P and vehicle speed Sp at step 600. At step 610, the CPU 61 makes a decision about an accelerating-/decelerating area. The accelerating/decelerating area is predetermined on the basis of the relationship between the vehicle speed Sp and the brake oil pressure P or the relationship between the vehicle speed Sp and the throttle opening angle change rate Δθ, and causes a tilt of the vehicle attitude.

Figure 23A:
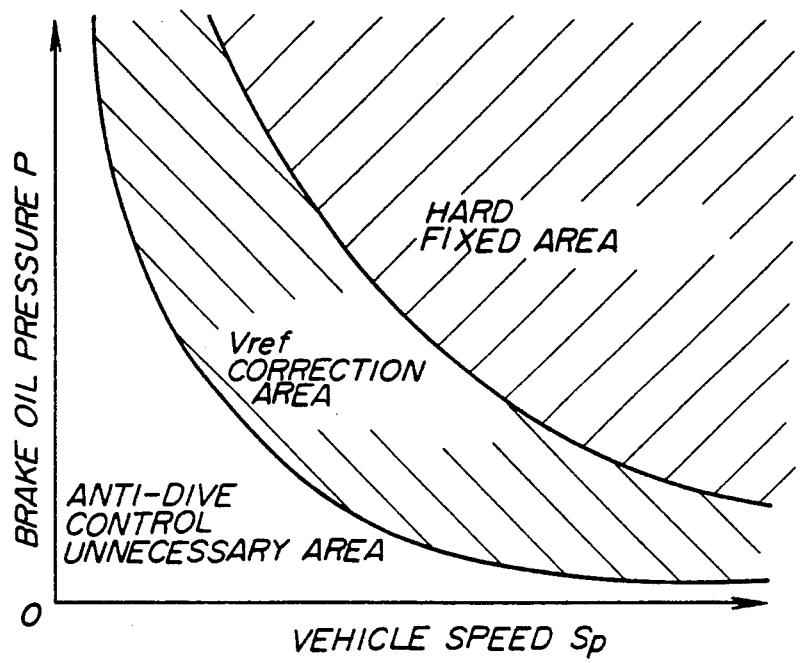
FIG. 23A is a graph illustrating the relationship between a brake oil pressure and vehicle speed.

FIG. 23A illustrates the relationship between the vehicle speed Sp and the brake oil pressure P. This relationship is referred to when the vehicle is being braked. The two-dimensional area defined by the vehicle speed Sp and the brake oil pressure P is divided into three areas, that is, an anti-dive control unnecessary area, a Vref correction area and a HARD fixed area. The dive of the vehicle occurs less in the anti-dive control unnecessary area. The dive of the vehicle is caused to some extent in the Vref correction area. A great dive is caused in the HARD fixed area.

Figure 23B:
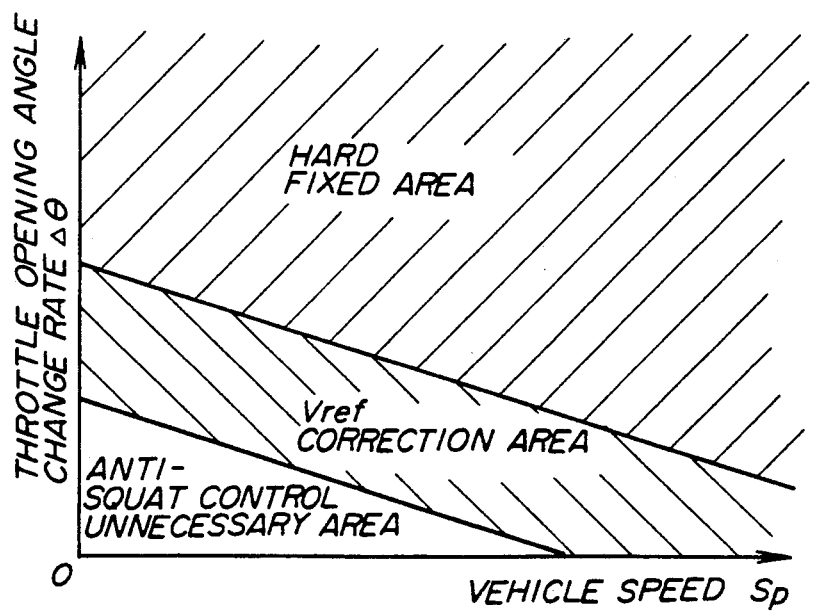
FIG. 23B is a graph illustrating the relationship between a throttle opening angle change rate and vehicle speed.

FIG. 23B illustrates the relationship between the vehicle speed Sp and the throttle opening angle change rate $\Delta\theta$. This relationship is referred to when the vehicle is being accelerated. The two-dimensional area defined by the vehicle speed and the throttle opening angle change rate $\Delta\theta$ is also divided into three areas, namely, an anti-squat control unnecessary control area, a Vref correction area and a HARD fixed area.

Turning now to FIG. 22, at step 610, the CPU 61 makes a decision on the current driving condition. When it is determined that the current driving condition is in the HARD fixed area and thus the occurrence of a great tilt of the vehicle attitude is predicted, at step 620, the CPU 61 sets the flag FH1 to 1. Thereby, it is indicated that the damping force of the shock absorber 2 should be set to the high level so that the suspension is set to the hard state. Then the procedure shown in FIG. 22 ends. The CPU 61 knows that FH=1 at step 410 (FIG. 21) and changes the damping force to the high level (hard) at step 420.

On the other hand, if it is determined, at step 610, that the current driving condition is in the Vref correction area, at step 630, a value $(1+\alpha)$ $(\alpha>0)$ is multiplied to the current alteration reference value Vref so that it is renewed so as to increase. At step 640, the CPU 61 determines whether or not the renewed alteration reference value Vref is greater than a guard value Vgd. The guard value Vgd defines the upper limit of the alteration reference value Vref. When Vref>Vgd, the flat FH is reset to zero at step 670. Then the procedure ends. The value $\alpha$ is constant or a function of the vehicle speed Sp.

The flag FH is set to zero at step 670 and the alteration reference value Vref is corrected so that it increases at step 630. Thus, the shock absorber 2 is not fixed to the hard state, but is instead dynamically set to the hard or soft state in accordance with the damping force change rate V. It will be noted that in this case it is difficult for the shock absorber 2 to be set to the soft state by step 630.

It is preferable that the alteration (adjustment) reference value be controlled by the aforementioned learning control which is employed in the first, second and third embodiments of the present invention.

On the other hand, when it is determined, at step 610, that the current driving condition is in the anti-dive control unnecessary area or the anti-squat control unnecessary area, the flag FH is set to zero at step 370. Then the procedure ends. In this case, the damping force of the shock absorber 2 is controlled by the procedure shown in FIG. 21. In this case, it is preferable that the alteration reference value be controlled by the aforementioned learning control which is employed in the first, second and third embodiments of the present invention.

According to the fourth preferred embodiment of the present invention, by using the damping force change rate V which has a high response characteristic, the damping force of each shock absorber 2 is rapidly controlled to an appropriate value in accordance with the driving condition and the vehicle vibration. That is, when the vehicle is running at an approximately constant speed, the damping force of the shock absorber 2 is immediately altered to the soft state if the damping force change rate V exceeds the alteration reference value Vref, and maintained in the soft state for the predetermined period (Tb). Thus, the riding comfort is improved.

On the other hand, when the vehicle is in the accelerating/decelerating state, the shock absorber is controlled as follows. When the driving condition is in the Vref correction area where the predicted tilt of the vehicle is not great, the value $(1+\alpha)$ is added to the current alteration reference value Vref. As a result, it becomes difficult for the shock absorber 2 to be altered to the soft state, so that good riding comfort is obtained where high driving stability and controllability is maintained. When the vehicle is in the HARD fixed area, the shock absorber 2 is immediately set to the hard state. Thus, high driving stability and controllability is obtained. By applying the aforementioned learning control to the alteration reference value Vref, each shock absorber 2 is more suitably controlled.

Figure 24A:
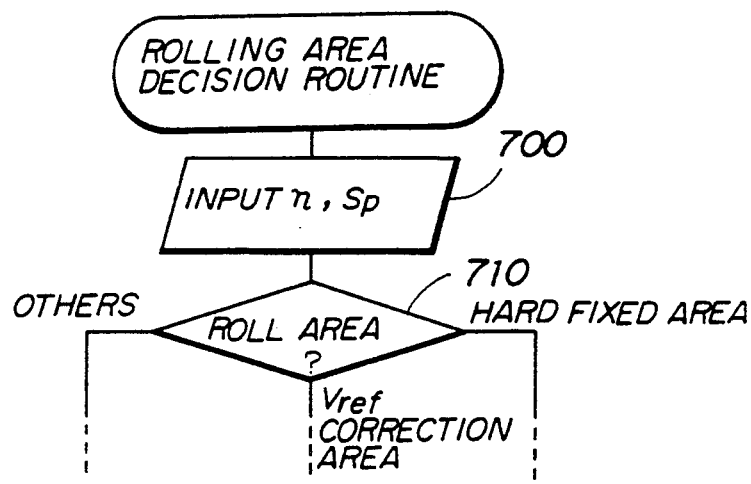
FIG. 24A is a flowchart illustrating an essential part of a variation of the operation shown in FIG. 22.
Figure 24B:
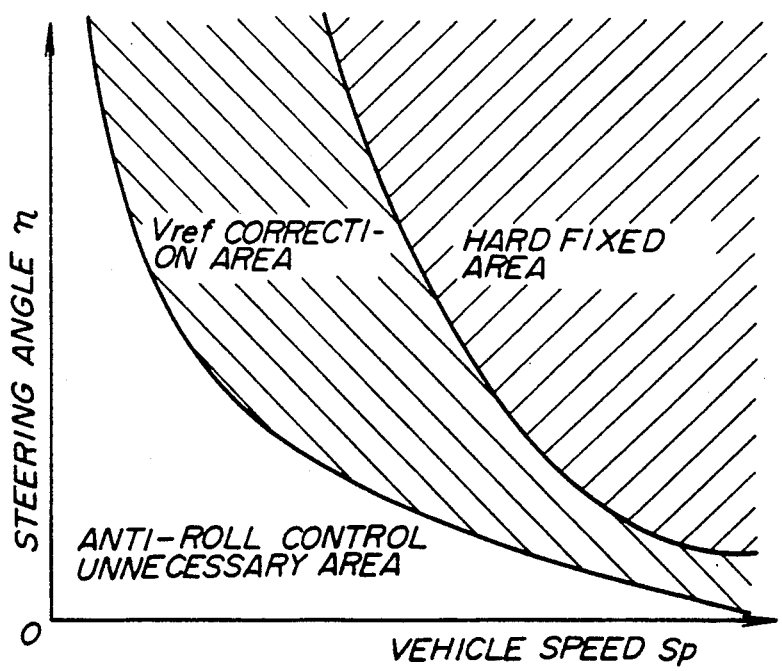
FIG. 24B is a graph illustrating the relationship between a steering angle and vehicle speed.

A variation of the fourth preferred embodiment of the present invention will now be explained with reference to FIGS. 24A and 24B. According to the variation, a decision on a roll area is made in place of the accelerating/decelerating area. As shown in FIG. 24A, the current steering angle $\eta$ and the vehicle speed Sp is input to the CPU 61 at step 700. FIG. 24B illustrates the relationship between the steering angle $\eta$ and the vehicle speed Sp. The two-dimensional roll area defined by the steering angle $\eta$ and the vehicle speed Sp is divided into three areas, that is, an anti-roll control unnecessary area, a Vref correction area and a HARD fixed area. In the anti-roll control unnecessary area, it is not necessary to control a roll of the vehicle. In the Vref correction area, it is necessary to set the shock absorber 2 to be harder than the shock absorber in the anti-roll control unnecessary area. In the HARD fixed area, it is necessary to maintain the shock absorber 2 in the hard state.

At step 710, the CPU 61 determines which one of the three areas is related to the current driving condition. In accordance with the decision result, the shock absorber 2 is controlled in the same way as shown in FIG. 22.

When the vehicle is running straight ahead or at a low speed, the damping force of the shock absorber 2 is immediately altered to the low level (soft state) if the damping force change rate V exceeds the alteration reference value Vref, and maintained in the soft state for the predetermined period (Tb). As a result, the shock absorber 2 is rapidly altered to the soft state so that the riding comfort is improved.

On the other hand, when a lateral force is exerted on the vehicle, the shock absorber is controlled as follows. When the driving condition is in the Vref correction area where the predicted roll of the vehicle is not great, the value $(1+\alpha)$ is added to the current alteration reference value Vref. As a result, it becomes difficult for the shock absorber 2 to be altered to the soft state, so that good riding comfort is obtained where high driving stability and controllability is maintained. When the vehicle is in the HARD fixed area where a great roll occurs, the shock absorber 2 is immediately set to the hard state. Thus, high driving stability and controllability is obtained. By applying the aforementioned learning control to the alteration reference value Vref, each shock absorber 2 is more suitably controlled.

It is possible to employ either the control shown in FIG. 22 or the control shown in FIG. 24A or both. In the case where both the controls shown in FIG. 22 and 24A are employed, the controls are separately carried out. For example, if the current driving condition is in the Vref correction area by either the control shown in FIG. 22 or the control shown in FIG. 24A, the shock absorber 2 is controlled so that the alteration reference value is increased by $(1+\alpha)$. In order to cope with a situation where the accelerating or decelerating vehicle is turned, it is possible to arrange the Vref correction area and the HARD fixed area so that they are more close to the origins of the coordinates shown in FIGS. 23A, 23B and 24B.

The present invention is not limited to the specifically disclosed embodiments, and variations and modifications may be made without departing from the scope of the present invention.

What is claimed is:

1. A suspension control system for controlling a suspension having a shock absorber provided for each wheel of a vehicle, said suspension control system comprising:
    damping force change rate detecting means for detecting a damping force change rate indicating a rate of change of a damping force of said shock absorber;
    damping force controlling means, coupled to said shock absorber and said damping force change rate detecting means, for changing the setting of said damping force based upon said damping force change rate and an adjustment reference value;
    road surface condition detecting means for detecting a roughness of a road surface on which said vehicle is running based upon said damping force of said shock absorber changed by said damping force controlling means; and
    damping force adjustment correcting means, coupled to said damping force controlling means and said road surface condition detecting means, for correcting said adjustment reference value according to said roughness of said road surface detected by said road surface condition detecting means.

2. A suspension control system as claimed in claim 1, wherein
    said damping force adjustment correcting means comprises frequency calculating means for calculating a frequency which indicates a number of times that said damping force change rate exceeds a learning reference value within a predetermined period, said frequency corresponding to said damping force of said shock absorber.

3. A suspension control system as claimed in claim 2, wherein said learning reference value is smaller than said adjustment reference value.

4. A suspension control system as claimed in claim 3, wherein said learning reference value is obtained by multiplying said adjustment reference value by a predetermined constant which is less than 1.

5. A suspension control system as claimed in claim 2, wherein said learning reference value is based upon a first learning reference value when said shock absorber is set to a hard state and is based upon a second learning reference value when said shock absorber is set to a soft state.

6. A suspension control system as claimed in claim 5, wherein said first learning reference value is greater than said second learning reference value.

7. A suspension control system as claimed in claim 2, wherein said damping force adjustment correcting means comprises:
    comparing means for comparing said frequency with a target frequency and for outputting a frequency deviation obtained by subtracting said target frequency from said frequency; and
    correcting means for correcting said adjustment reference value based upon said frequency deviation.

8. A suspension control system as claimed in claim 7, wherein said correcting means corrects said adjustment reference value so that said frequency deviation becomes substantially zero.

9. A suspension control system as claimed in claim 7, wherein said correcting means increases said adjustment reference value so that it is difficult for said shock absorber to change to a soft state when said frequency is grater than said target frequency, and decreases said adjustment reference value so that it is easy for said shock absorber to change to said soft state when said frequency is equal to or less than said target frequency.

10. A suspension control system as claimed in claim 7, wherein said suspension control system further comprises:
    speed sensor means for measuring a vehicle speed; and
    calculating means for calculating a base value according to said vehicle speed measured by said speed sensor means, said adjustment reference value being based upon said base value.

11. A suspension control system as claimed in claim 10, wherein said adjustment reference value is also based upon a learning correction value, in addition to said base value, and wherein said damping force adjustment correcting means comprises:
    first correcting means for increasing said learning correction value so that said adjustment reference value increases and it becomes difficult for said shock absorber to change to a soft state when said frequency is greater than said target frequency; and
    second correcting means for decreasing said learning correction value so that said adjustment reference value decreases and it becomes easy for said shock absorber to change to said soft state when said frequency is equal to or less than said target frequency.

12. A suspension control system as claimed in claim 10, wherein said base value increases with an increase in said vehicle speed so that it becomes difficult for said shock absorber to change to a soft state.

13. A suspension control system as claimed in claim 10, wherein said suspension control system further comprises:
    comparing means for comparing said frequency with said target frequency and for outputting a frequency deviation obtained by subtracting said target frequency from said frequency; and
    correcting means for correcting said adjustment reference value based upon said frequency deviation, wherein said correcting means increases or decreases said learning correction value by a unit value which is based on said frequency deviation.

14. A suspension control system as claimed in claim 13, wherein said unit value positively increases as said frequency deviation positively increases, and negatively increases as said frequency deviation negatively increases.

15. A suspension control system as claimed in claim 14, wherein said unit value increases stepwise.

16. A suspension control system as claimed in claim 13, wherein said target frequency is a function of said vehicle speed, and wherein said suspension control system further comprises second calculating means for calculating said target frequency based upon said vehicle speed measured by said speed sensor means.

17. A suspension control system as claimed in claim 7, wherein said suspension control system further comprises:
speed sensor means for measuring a vehicle speed; and
calculating means for calculating said target frequency based upon said vehicle speed measured by said speed sensor means, said target frequency being a function of said vehicle speed.

18. A suspension control system as claimed in claim 17, wherein said target frequency decreases with an increase in said vehicle speed so that it becomes difficult for said shock absorber to change to a soft state.

19. A suspension control system as claimed in claim 1, wherein when said damping force change rate exceeds said adjustment reference value, said damping force controlling means changes said shock absorber from a hard state to a soft state.

20. A suspension control system as claimed in claim 1, wherein when said road surface condition detecting means determines that said vehicle is continuously running on a substantially flat road surface, said damping force adjustment correcting means corrects said adjustment reference value so that it becomes easy for said shock absorber to change to a soft state from a hard state and when said road surface condition detecting means determines that said vehicle is continuously running on a rough road surface, said damping force adjustment correcting means controls said adjustment reference value so that it becomes easy for said shock absorber to change to said hard state from said soft state.

21. A suspension control system for controlling a suspension having a shock absorber provided for each wheel of a vehicle, said suspension control system comprising:
damping force change rate detecting means for detecting a damping force change rate indicating a rate of change of a damping force of said shock absorber;
driving condition detecting means for detecting a driving condition of said vehicle which causes a tilt of a vehicle attitude of said vehicle;
damping force controlling means, coupled to said shock absorber and said damping force change rate detecting means, for changing a setting of said damping force based upon said damping force change rate and an adjustment reference value;
correction means, coupled to said damping force controlling means, for comparing said tilt of said vehicle attitude to a first threshold value and for controlling said adjustment reference value so that it becomes difficult for said shock absorber to change to a soft state from a hard state when said tilt of said vehicle attitude is equal to or greater than said first threshold value; and
shock absorber characteristic fixing means, coupled to said driving condition detecting means and said shock absorber, for comparing said tilt of said vehicle attitude to a second threshold value which is greater than said first threshold value and for fixing said shock absorber to said hard state when said tilt of said vehicle is equal to or greater than said second threshold value.

22. A suspension control system as claim in claim 21, wherein said correction means increases said adjustment reference value so that it becomes difficult for said shock absorber to change to said soft state when said tilt of said vehicle attitude is equal to or greater than said first threshold value.

23. A suspension control system as claimed in claim 21, further comprising damping force adjustment correcting means for correcting said adjustment reference value according to said damping force of said shock absorber.

24. A suspension control system as claimed in claim 21, wherein when said damping force change rate exceeds said adjustment reference value, said damping force controlling means changes said shock absorber from said hard state to said soft state.

25. A suspension control system as claimed in claim 23, wherein:
said damping force adjustment correcting means comprises frequency calculating means for calculating a frequency which indicates a number of times that said damping force change rate exceeds a learning reference value within a predetermined period, said frequency corresponding to said damping force of said shock absorber.

26. A suspension control system as claimed in claim 25, wherein said damping force adjustment correcting means comprises:
comparing means for comparing said frequency with a target frequency and for outputting a frequency deviation obtained by subtracting said target frequency from said frequency; and
correcting means for correcting said adjustment reference value so that said frequency deviation becomes substantially zero.

27. A suspension control system as claimed in claim 21, wherein said tilt of said vehicle attitude includes a dive of said vehicle or a squat thereof.

28. A suspension control system as claimed in claim 21, wherein said tilt of said vehicle attitude includes a roll of said vehicle.

* * * * *